(12) United States Patent
Pappachan et al.

(10) Patent No.: US 11,665,144 B2
(45) Date of Patent: May 30, 2023

(54) SESSION MANAGEMENT FRAMEWORK FOR SECURE COMMUNICATIONS BETWEEN HOST DEVICES AND TRUSTED DEVICES

(71) Applicant: Intel Corporation, Santa Clara, CA (US)

(72) Inventors: Pradeep M. Pappachan, Tualatin, OR (US); Reshma Lal, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/743,659

(22) Filed: May 13, 2022

(65) Prior Publication Data

US 2022/0272076 A1 Aug. 25, 2022

Related U.S. Application Data

(63) Continuation of application No. 16/725,343, filed on Dec. 23, 2019, now Pat. No. 11,349,817.

(51) Int. Cl.
*H04L 9/40* (2022.01)
*H04W 12/04* (2021.01)
(Continued)

(52) U.S. Cl.
CPC .......... *H04L 63/0428* (2013.01); *G06F 21/57* (2013.01); *H04L 9/0841* (2013.01);
(Continued)

(58) Field of Classification Search
CPC . H04L 63/061; H04L 63/0428; H04L 9/0841; H04W 12/06; H04W 12/04; G06F 21/57
See application file for complete search history.

(56) References Cited

U.S. PATENT DOCUMENTS 7,490,125 B1 * 2/2009 Jagadeesan ............. G06F 9/451
379/265.06
8,442,227 B1 * 5/2013 Yoakum .................. H04L 67/14
709/228
(Continued)

OTHER PUBLICATIONS

White Paper, "Trusted Execution Environment (TEE) 101: A Primer", Secure Technology Alliance, Apr. 2018, 24 pages.
(Continued)

*Primary Examiner* — Chau Le
(74) *Attorney, Agent, or Firm* — Jaffery Watson Mendonsa & Hamilton LLP

(57) ABSTRACT

Embodiments are directed to a session management framework for secure communications between host systems and trusted devices. An embodiment of computer-readable storage mediums includes instructions for establishing a security agreement between a host system and a trusted device, the host device including a trusted execution environment (TEE); initiating a key exchange between the host system and the trusted device, including sending a key agreement message from the host system to the trusted device; sending an initialization message to the trusted device; validating capabilities of the trusted device for a secure communication session between the host system and the trusted device; provisioning secrets to the trusted device and initializing cryptographic parameters with the trusted device; and sending an activate session message to the trusted device to activate the secure communication session over a secure communication channel.

20 Claims, 14 Drawing Sheets

(51) Int. Cl.
*H04W 12/06* (2021.01)
*H04L 9/08* (2006.01)
*G06F 21/57* (2013.01)

(52) U.S. Cl.
CPC .......... *H04L 63/061* (2013.01); *H04W 12/04* (2013.01); *H04W 12/06* (2013.01)

(56) References Cited

U.S. PATENT DOCUMENTS

| | | |
|---|---|---|
| 10,462,145 B2 * | 10/2019 | Ruiz ................ H04L 67/34 |
| 2019/0227827 A1 * | 7/2019 | Zmudzinski ............ G06F 21/62 |
| 2019/0281031 A1 | 9/2019 | Pothula et al. |
| 2020/0322382 A1 | 10/2020 | Wang et al. |

OTHER PUBLICATIONS

White Paper, "Universal Serial Bus Type-C(tm) Authentication Specification", Jul. 24, 2017, Release 1.0 with ECN and Errata, (Revision 1.0 with ECN and Errata through Jul. 24, 2017) 66 pages.

Notice of Allowance for U.S. Appl. No. 16/725,343 dated Feb. 2, 2022, 8 pages.

Notice of Allowance for U.S. Appl. No. 16/725,343 dated Oct. 18, 2021, 7 pages.

Intel: PCI Express Device Security Enhancements, Sep. 2018, Version 0.71, 46 pages.

* cited by examiner

Read Mailbox Register

| 31 | 0 |
|---|---|
| Device Response | |

*FIG. 5F*

Write Mailbox Register

| 31 | 0 |
|---|---|
| Host Message | |

*FIG. 5G*

SESSION MANAGEMENT FRAMEWORK FOR SECURE COMMUNICATIONS BETWEEN HOST DEVICES AND TRUSTED DEVICES

CLAIM TO PRIORITY

This application is a continuation of and claims the benefit of and priority to U.S. application Ser. No. 16/725,343 entitled SESSION MANAGEMENT FRAMEWORK FOR SECURE COMMUNICATIONS BETWEEN HOST DEVICES AND TRUSTED DEVICES, by Pradeep M. Pappachan, et al., filed Dec. 23, 2019, the entire contents of which are incorporated herein by reference.

TECHNICAL FIELD

Embodiments described herein generally relate to the field of electronic devices and, more particularly, a session management framework for secure communications between host systems and trusted devices.

BACKGROUND

In computer system operations, in order to safely transfer I/O data, a secure channel generally must be established. For example, for trusted I/O between a trusted execution environment (TEE) on a host system and a trusted I/O device or hardware accelerator device, the two endpoints need to establish a secure communication channel for communication.

However, the establishment and maintenance of the secure channel can be complex, and requires the exchange of data to establish the trust required for secure communications, including reporting of device configurations, provisioning of secrets, and sending/receiving data, all with confidentiality, integrity, and replay protection.

BRIEF DESCRIPTION OF THE DRAWINGS

Embodiments described here are illustrated by way of example, and not by way of limitation, in the figures of the accompanying drawings in which like reference numerals refer to similar elements.

FIG. 5F is an illustration of a read mailbox register for a session management register interface according to some embodiments;

FIG. 5G is an illustration of a write mailbox register for a session management register interface according to some embodiments;

DETAILED DESCRIPTION

Embodiments described herein are directed to a session management framework for secure communications between host systems and trusted devices.

In some embodiments, a system or process is provided for a framework that enables a trusted device, such as a I/O device or hardware accelerator device, and a host trusted execution environment (TEE) to establish a secure session for the purpose of trusted I/O. The session framework includes a secure session state machine, a secure host-device interface, and session protocols for a secure session. The trusted device may in general be a PCIe (PCI (Peripheral Component Interconnect) Express) device operating under the PCIe protocol, PCIe describing a standard high-speed serial connection.

Figure 1:
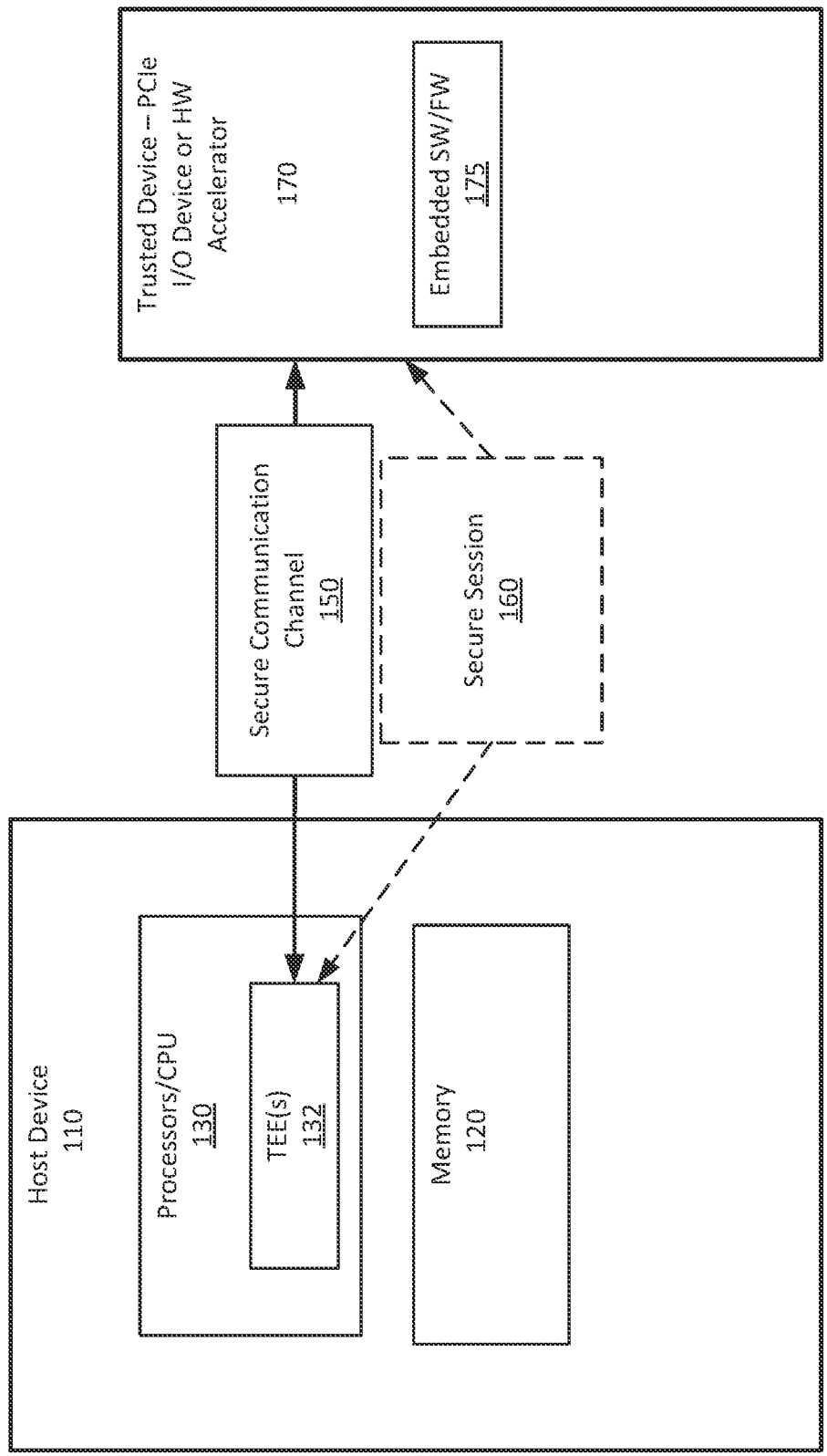
FIG. 1 is an illustration of session management for a host system and a trusted device according to some embodiments.

FIG. 1 is an illustration of session management for a host system and a trusted device according to some embodiments. As illustrated in FIG. 1, a secure channel 150 is required for secure communications between a TEE 132 of a CPU or other processor 130 of a host system 110 and a trusted device 170, wherein the trusted device 70 is a PCIe I/O device or hardware accelerator device. As illustrated, the host system 110 further includes memory 120 for the storage of data, and the trusted device 170 may further include embedded software or firmware 175 to provide instructions for operations, including operations to support secure communications.

For trusted I/O between a TEE (such as Intel® SGX (Software Guard Extensions) or TDX (Trusted Domain Extensions)) on a host system 110 and an I/O device or hardware accelerator device 170 (generally referred to herein as a device or trusted device), the two endpoints for communication must establish a secure communication channel 150 for reporting device configuration, provisioning secrets, and sending/receiving data, all with confidentiality, integrity and replay protection. In order to set up the secure communication channel, the device 170 is required to authenticate to the host TEE 132 and exchange a symmetric key using an authenticated key agreement protocol.

In some embodiments, trusted I/O for the secure communication channel 150 is established for a secure session 160 between the host TEE 132 and the trusted device 170 according to a session protocol, wherein the session protocol establishes one or more of the following:

(a) A secure session in the context of trusted I/O between a host TEE and a trusted device.

(b) A session lifecycle to define commencement, operation, and termination of a secure session.

(c) A register interface that is used by host software to send messages to the device for managing the secure session.

(d) A process for the host to discover the capabilities of the device for managing a secure session.

(e) A process for the host system to negotiate a secure session with the trusted device based on the capabilities discovered.

(f) A process for execution of key agreement protocol between host system and trusted device.

(g) Initializing and provisioning a secure session with secrets for trusted I/O.

(h) Activation of the session and preparation for runtime before the session is finally terminated under various conditions, wherein the conditions may include both normal (e.g., planned session termination) and abnormal (e.g., errors or other conditions causing unplanned termination) conditions.

As further used herein:

For the purpose of trusted I/O, a "session" refers to an association between a host system and a trusted device for the purpose of secure communications.

"Host Session Endpoint" (HSE) refers to a software entity on the host system that is one endpoint of a secure communication channel with the device.

"Device Session Endpoint" (DSE) refers to a function within a trusted. device that is the other endpoint of a secure communication channel with the host system.

"Session Capability" refers to the ability of the trusted device and host system to provide a service that is required to establish a session. For example, device authentication is a capability of a device that enables a host system to verify the identity of the device and is a prerequisite for establishing a session. Other examples of capabilities include key agreement and link- or transaction-level protection.

"Capability Attribute" refers to a feature of a session capability. For example, a device supporting a key agreement capability might support various key agreement protocols, such as SIGMA and ECDH (Elliptic-curve Diffie-Hellman). Each supported protocol is an attribute of the capability.

"Security Association" (SA) refers to a set of agreed-upon session capabilities and their attributes that will be used to manage the session between the device and the host.

"Session State" (SS) refers to a current condition of the device vis-à-vis the session lifecycle.

Further, the following values are defined:

"Session Context" (CTX) is defined as the tuple<SA, SS>.

"Session" is defined as the 3-tuple<HSE, DSE, CTX>.

In the communications between a host and a trusted device, there are different types of sessions that may be established, including:

(1) Physical Endpoint Session (PE Session)—A PE session encompasses the whole device in its scope. There can only be one PE session for a device, the PE session being associated with PF 0 on the device. A trusted agent on the host establishes a PE session with the device. Certain session management capabilities are exclusively available only to the primary session (e.g., PCIe Link-level protection). In some embodiments, the purpose of establishing a PE session is to be able to set up a secure communication channel between a host system and a trusted device through which secrets can be provisioned to the device and aspects of the device's behavior can be controlled through special commands.

(2) Virtual Endpoint Session (VE Session)—In addition to the PE session, a device may support one or more VE sessions. VE sessions may be established on top of a PE session (i.e., the VE sessions depend on some capabilities of the PE session) or may be standalone. For VE sessions of the first kind, the device can multiplex several VE sessions over a PE session. For example, an entity on the host may set up a VE session with a VF in a device. While the PE session is used to set up a secure channel between the host and device, the host can interact with the endpoint of the VE session over the secure channel that is thus established. Certain session management capabilities are available to both PE and VE sessions. For example, vendor-defined transaction-level protections may be available at the VE session layer that allow the host and virtual endpoint in the device to communicate securely. The key used to enforce the transaction-level protections may be provisioned over the secure channel established for the PE session. In the case of standalone VE sessions, the host and a virtual endpoint inside the device might execute a Key Agreement protocol and establish a shared, symmetric key. The host can then provision the key for encrypting session data using this shared key.

Figure 2:
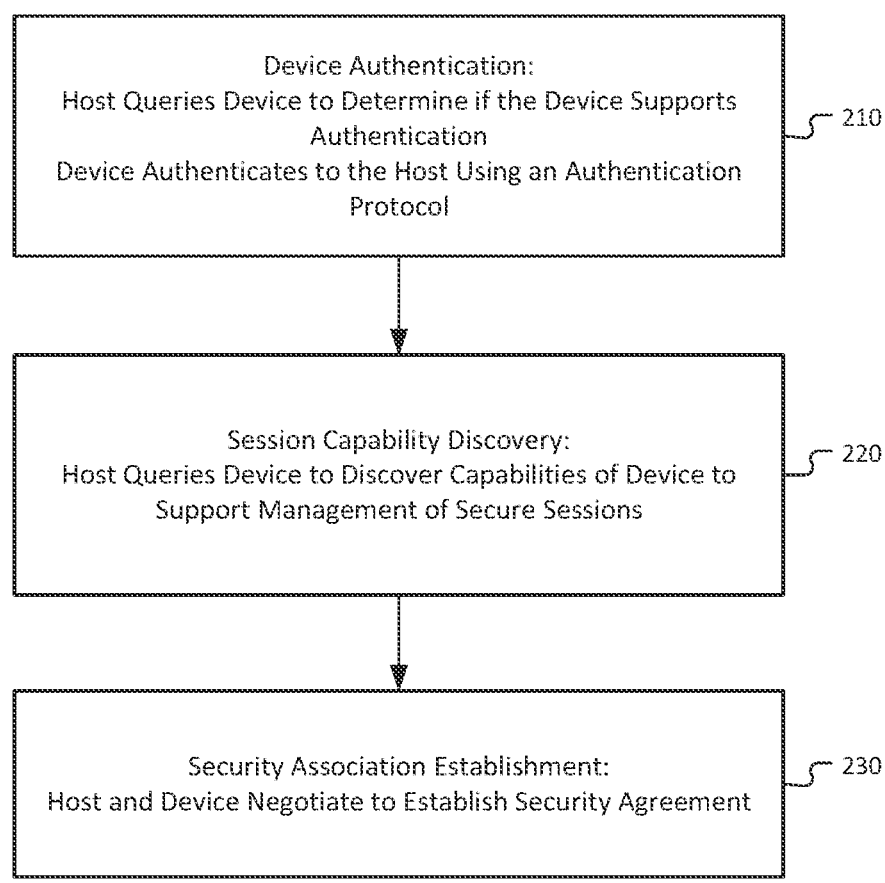
FIG. 2 is an illustration of prerequisite processes for establishment of a secure session between a host system and a trusted device according to some embodiments.
Figure 3:
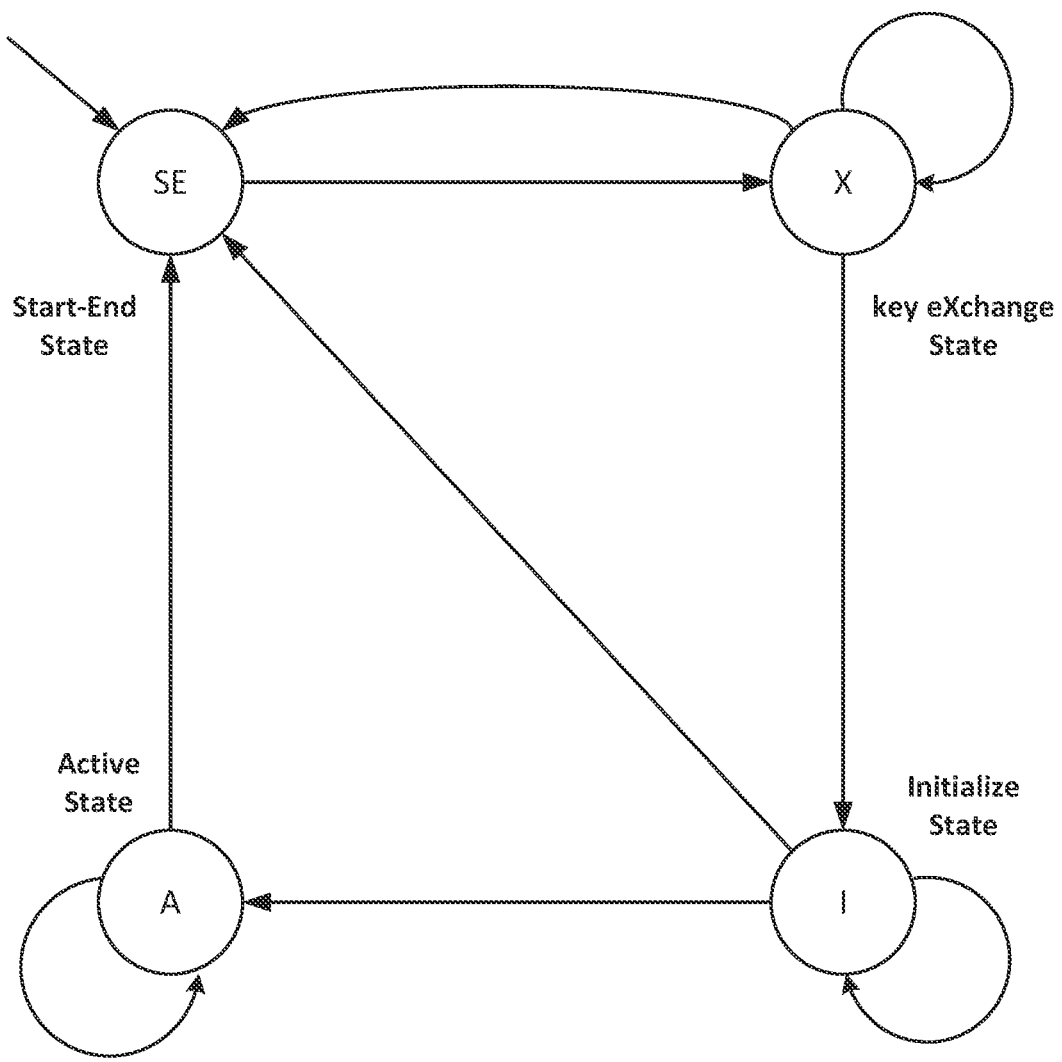
FIG. 3 is a state machine to illustrate a lifecycle of a secure session between a host system and a trusted device according to some embodiments.

FIG. 2 is an illustration of prerequisite processes for establishment of a secure session between a host system and a trusted device according to some embodiments. There are several states in the lifecycle of a session that may be described in terms of a session management state machine, such as illustrated in FIG. 3. Before the state machine is entered, the host and the device are required to conclude certain prerequisite processes:

(a) Device Authentication 210: An initial process requires the host to query the device to determine if the device supports authentication. The device authenticates to the host using an authentication protocol. The PCIe Device Authentication portion of the PCI Express Device Security Enhancements specification describes the PCIe configuration space capability registers and messages that can be used by the host to query the device and engage in the authentication protocol with it.

(b) Session Capability Discovery 220: The host is to query the device to discover the capabilities that the device supports for managing secure sessions.

(c) Security Association Establishment 230: Following session capability discovery, the host and device are to negotiate to establish a Security Association between them, based on the capabilities and attributes discovered in the prior process.

FIG. 3 is a state machine to illustrate a lifecycle of a secure session between a host system and a trusted device according to some embodiments. Following execution of certain required prerequisite processes, as illustrated in FIG. 2, the host and device are to begin a process to establish a session. FIG. 3 shows the session state machine, which consists of four states:

SE (State-End) State: The "SE" state represents the Start and End of a secure session between the host system and the trusted device.

X (key Xchange) State: In the "X" state, the host and the device engage in a Key Agreement protocol to establish a shared symmetric encryption key.

I (Initialize) State: In the "I" state, the host initializes the secure session between the host and device.

A (Active) State: In the "A" state, the secure session has been initialized and the host and device are communicating securely using the secure communication channel that has been established.

Figure 4A:
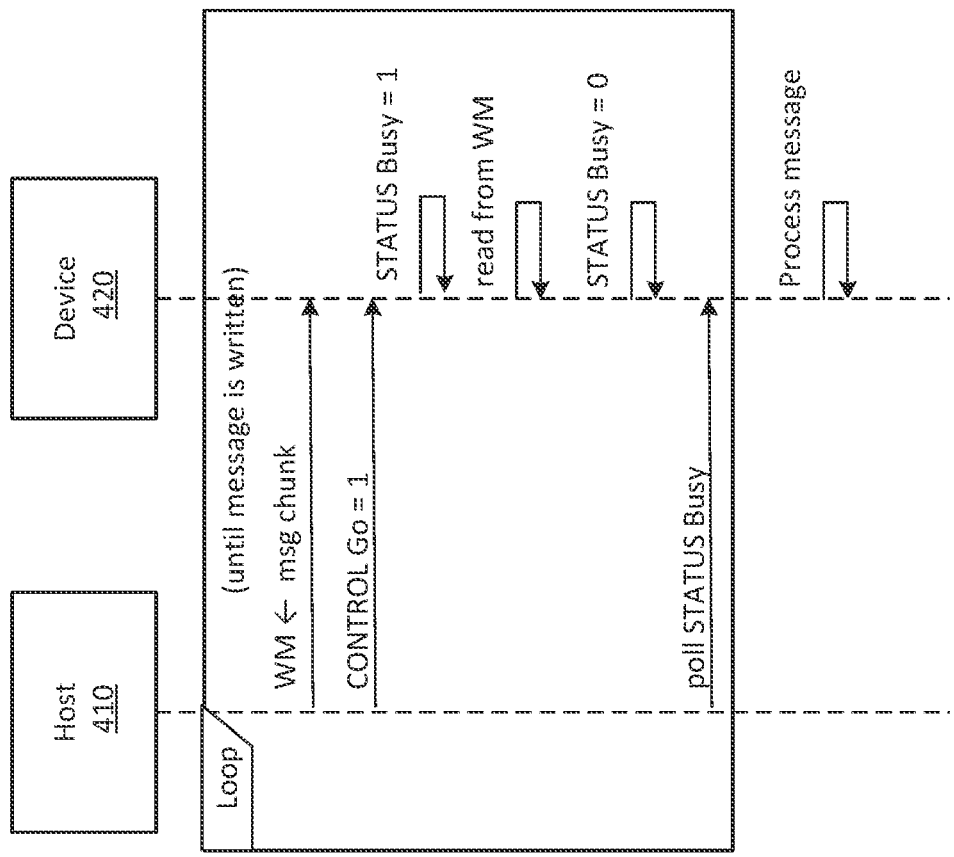
FIG. 4A is an illustration of a flow of processes for a host transmission of messages to a device according to some embodiments.

Further details regarding the state machine processes may be as illustrated in FIG. 6A-6D FIG. 4A is an illustration of a flow of processes for a host transmission of messages to a device according to some embodiments. FIG. 4A illustrates the processes involved when the host 410 transmits a message to the device 420. Because the Write Mailbox is limited in size (32 bits long, as shown in FIG. 5G) and messages may be longer, the host 410 is required to break longer messages into chunks that are 32 bits or smaller, and write these chunks to the mailbox (WM←msg chunk).

After each chunk is written to the mailbox, the host 410 asserts the Go bit in the Control register (CONTROL Go=1). The device 420 then asserts the Busy bit in the Status register (STATUS Busy=1) to indicate that it has begun processing the message in the mailbox (read from WM). During this time, the host 410 polls the Busy bit in the Status register, which is cleared by the device (STATUS Busy=0) when it has finished consuming the data in the Write Mailbox. The host 410 and device 420 continue to execute the processes in this loop until the device has consumed the entire message from the host, and may then process the message.

Figure 4B:
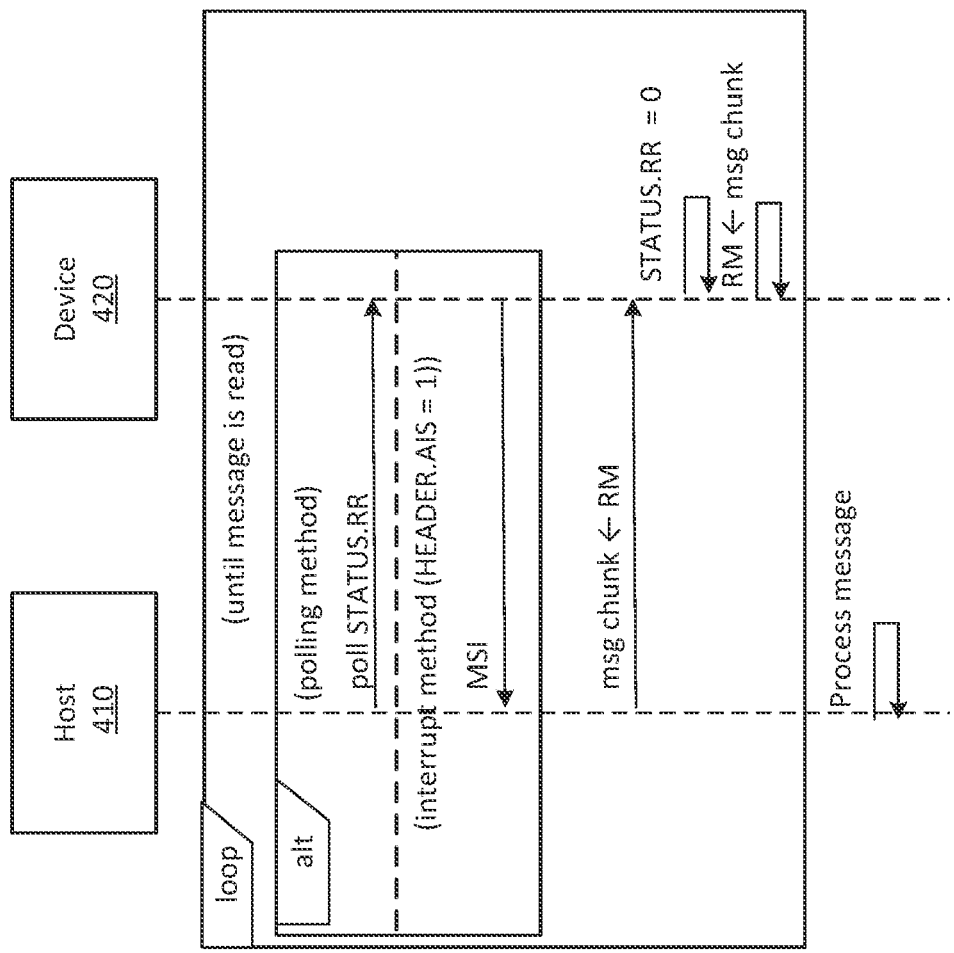
FIG. 4B is an illustration of a flow of processes for a host reception of a message from 1 device according to some embodiments.

FIG. 4B is an illustration of a flow of processes for a host reception of a message from 1 device according to some embodiments. FIG. 4B illustrates the processes involved when the host 410 receives a message from the device 420. Analogous to the process for the Write scenario illustrated in FIG. 4A, a response from the device 420 may be longer than the Read Mailbox, which may again be 32 bits long (as shown in FIG. 5F). The device 420 is to break longer messages into chunks that can fit into the Read Mailbox. The host 410 can sample the RR bit in the Status register (poll STATUS.RR) or be interrupted by the device 420 when the next chunk of the response is ready. The host 410 reads the chunk from the Read Mailbox register. When the host 410 has consumed a chunk, the device 420 clears the RR bit and it remains in that state until it has written the next chunk to the mailbox. After all the chunks have been read and assembled by the host, the host 410 processes the response message from the device 420.

Figure 5A:
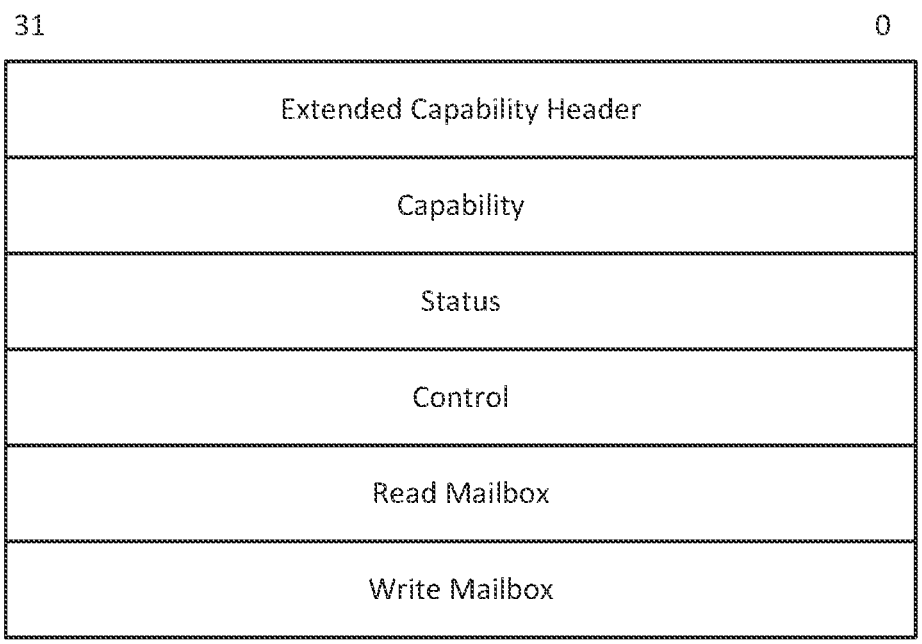
FIG. 5A is an illustration of a session management register interface for establishment and operation of a secure session according to some embodiments.

FIG. 5A is an illustration of a session management register interface for establishment and operation of a secure session according to some embodiments. The PCI Express Device Security Enhancements Specification defines a register interface in the PCIe configuration space that the host and device can use for authentication and attestation. The interface consists of capability, control, status and generic read/write mailbox registers that are applied with certain modifications for the Session Management capability.

In some embodiments, a register set is established for session management, with FIG. 5A providing an example of a session management register interface. The registers provided in the session management register interface may be as illustrated in FIGS. 5B-5G.

Figure 5B:
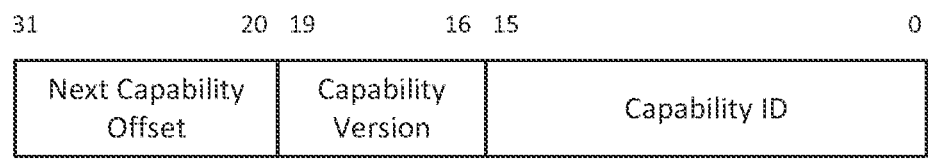
FIG. 5B is an illustration of an extended capability header register for a session management register interface according to some embodiments.

FIG. 5B is an illustration of an extended capability header register for a session management register interface according to some embodiments. The register enumerates the PCI Express Capability structure in the PCI Configuration Space Capability list, as follows in Table 1:

TABLE 1

Extended Capability Header Register

| Bit Location | Field Description | Attributes |
|---|---|---|
| 15:0 | Capability ID - ID for Trusted Device Session Management capability | RO |
| 19:16 | Capability Version. | RO |
| 31:20 | Next Capability Offset - Offset to the next capability structure or 000h if no other items exist in the linked list of capabilities. | RO |

Figure 5C:
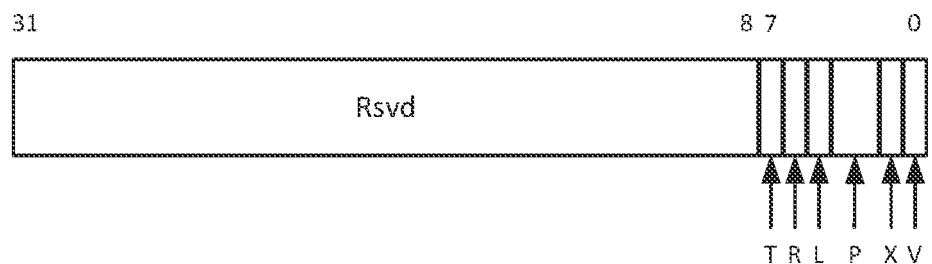
FIG. 5C is a capability header register for a session management register interface according to some embodiments.

FIG. 5C is a capability header register for a session management register interface according to some embodiments. The register advertises the different capabilities supported by the device, as follows in Table 2:

TABLE 2

Capability Register

| Bit Location | Field Description | Attributes |
|---|---|---|
| 0 | V - Supports Virtual Endpoint (VE) sessions | RO |
| 1 | X - Supports Key Agreement protocols. | RO |
| 4:2 | P - Supports security at different PCIe layers. 001h: Link-level protection; 010h: Transaction-level protection; 100h: Data-level protection. The device might support multiple levels of protection. In that case, the bit strings corresponding to the individual protection levels must be OR'ed. | RO |
| 5 | L - Supports endpoint locking. Locking down an endpoint means that the device shall only allow authorized entities on the host, such as controlling TDs or enclaves, to write/read to/from sensitive registers that control the operation of the endpoint. | RO |
| 6 | R - Supports configuration reporting. | RO |
| 7 | T - Supports host-defined session termination policies. | RO |
| 31:8 | Reserved. | Rsvd |

Figure 5D:
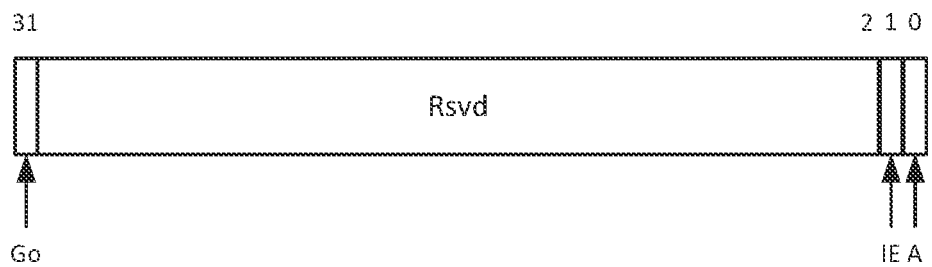
FIG. 5D is an illustration of a control register for a session management register interface according to some embodiments.

FIG. 5D is an illustration of a control register for a session management register interface according to some embodiments. The register allows the host to control the behavior of the device, and may be identical to the Control register defined for PCIe Device Authentication, as follows in Table 3:

TABLE 3

Control Register

| Bit Location | Field Description | Attributes |
|---|---|---|
| 0 | A - Abort. When set, the current message sent by the host is aborted by the device. | RW |

TABLE 3-continued

Control Register

| Bit Location | Field Description | Attributes |
|---|---|---|
| 1 | IE - Interrupt Enable. When set and MSI/MSI-X is enabled, the device must issue an MSI/MSI-X interrupt to indicate the 0b to 1b transition of the Response Ready (RR) bit in the Status register. | RW |
| 30:2 | Reserved. | Rsvd |
| 31 | Go - A write of 1b to this bit indicates to the device that it can start consuming the message written to the Write Mailbox register. | WO |

Figure 5E:
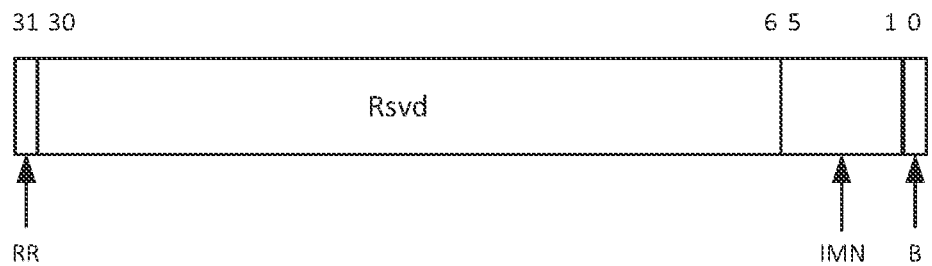
FIG. 5E is an illustration of a status register for a session management register interface according to some embodiments.

FIG. 5E is an illustration of a status register for a session management register interface according to some embodiments. The register is used by the host to read responses from the device, and may be identical to the Read Mailbox register defined for PCIe Device Authentication, as follows:

TABLE 4

Status Register

| Bit Location | Field Description | Attributes |
|---|---|---|
| 0 | B - Busy. When set, this bit indicates that the device is busy processing a request. | RO |
| 5:1 | IMN - Interrupt Message Number. This field indicates which MSI/MSI-X vector is used for the valid interrupt message. For MSI, this field indicates the offset between the base Message Data and the interrupt message that is generated. Hardware must update this field when the host sets the Multiple Message Enable field in the MSI Message Control register if the number of MSI messages assigned to the Function is less than the value of this register. For MSI-X, this field indicates the index of the MSI-X Table entry used to generate the interrupt message. For a given MSI-X implementation, the entry must remain constant. | RO |
| 30:6 | Reserved. | Rsvd |
| 31 | Response Ready - When set, this bit indicates to the host that the device has a valid message for it. It must be cleared only after the message has been completely consumed. | RO |

FIG. 5F is an illustration of a read mailbox register for a session management register interface according to some embodiments. The register is used by the host to read responses from the device, and may be identical to the Read Mailbox register defined for PCIe Device Authentication, as follows in Table 5:

TABLE 5

Read Mailbox Register

| Bit Location | Field Description | Attributes |
|---|---|---|
| 31:0 | Response from device for host. The data in this register is only valid after the RR bit in the Status register is set. | RO |

FIG. 5G is an illustration of a write mailbox register for a session management register interface according to some embodiments. The register is used by the host to write messages for the device, and may be identical to the Write Mailbox register defined for PCIe Device Authentication, as follows in Table 6:

TABLE 6

Write Mailbox Register

| Bit Location | Field Description | Attributes |
|---|---|---|
| 31:0 | Message from host for device. | RW |

Message Format: Messages exchanged between the host and device are to conform to the format defined in Table 7. Each message is comprised of a header (8 bytes) and payload (size depends on type of message).

TABLE 7

Message Format

| Offset | Field | Size (Bytes) | Description |
|---|---|---|---|
| 0 | T: Type | 2 | Type of message. Maximum of 2 ^ 16 = 65536 types. |
| 1 | V: Version | 1 | Version number for this capability. |
| 2 | Reserved | 2 | |
| 4 | L: Payload Length | 4 | Length of the payload. |
| 8 | P: Payload | Header.L | Content of request from host or response from device |

The type field divides the message space into two partitions: reserved and vendor-defined. Bit 8 of the Type field is 0 for the reserved message space and 1 for the vendor-defined messages. Thus, it is possible to have a maximum of 32768 vendor-defined message types.

Table 8 defines the various message categories and the associated prefix in the Message Type field of messages. The MSB (bit 15) of the 16-bit field identifies if the message belongs to the reserved category of the vendor-defined category. Messages are further divided into five categories: (i) Session Capability Discovery; (ii) Session Negotiation; (iii) Key Agreement; (iv) Session Initialization; and (v) Runtime. Each category is assigned 3 bits (14:12). Together, prefix bits 15:12 map messages to the different categories. The maximum number of messages that can be defined in each category is $2^{(16-4)}=4096$.

TABLE 8

Message Type Prefixes

| Message Category | Message Type Prefix (Reserved Messages) | Message Type Prefix (Vendor-defined Messages) |
|---|---|---|
| Session Capability Discovery | 0000b | 1000b |
| Session Negotiation | 0001b | 1001b |
| Key Agreement | 0010b | 1010b |
| Session Initialization | 0011b | 1011b |
| Runtime | 0100b | 1100b |

Capability Discovery: The host reads the Capability register to discover the capabilities of the device. For each capability, such as Key Agreement, the host is to query the device to obtain the attributes associated with the capability. For example, the attributes of the Key Agreement capability would describe the supported protocols and various cryptographic algorithms (e.g., hashing, signing, etc.).

Each capability is associated with a 4-bit identifier as shown in Table 9:

TABLE 9

Capability Identifiers

| Capability | Capability Identifier |
|---|---|
| V: VIRTUAL_ENDPOINT_SESSIONS | 0000b |
| X: KEY_AGREEMENT | 0001b |
| P: LINK_LEVEL_PROTECTION | 0010b |
| P: TRANSACTION_LEVEL_PROTECTION | 0011b |
| P: APPLICATION_LEVEL_PROTECTION | 0100b |
| L: ENDPOINT_LOCKING | 0101b |
| R: CONFIGURATION_REPORTING | 0110b |
| T: SESSION_TERMINATION_POLICY | 0111b |

As described above, not all capabilities apply to virtual sessions. Table 10 defines the scope of each capability.

TABLE 10

Capability Scope

| Capability | PE Session | VE Session | Notes |
|---|---|---|---|
| KEY_AGREEMENT | √ | √ | |
| LINK_LEVEL_PROTECTION | √ | | Link-level operation is controlled at the device level and not at the virtual device endpoint level. |
| TRANSACTION_LEVEL_PROTECTION | √ | √ | |
| APPLICATION_LEVEL_PROTECTION | √ | √ | |
| ENDPOINT_LOCKING | √ | √ | |
| CONFIGURATION_REPORTING | √ | | Configuration reporting is done at the device level. System software may decide which details are appropriate to expose to endpoints of virtual sessions on the host. |
| SESSION_TERMINATION_POLICY | √ | √ | |

In some embodiments, each capability has one or more attributes associated with it. These attributes are also associated with unique identifiers. Using a combination of attribute identifiers and values, a capability can be fully enumerated by the host. Table 11 defines 4-bit capability attribute identifiers.

TABLE 11

Capability Attribute Identifiers

| Capability | Attribute | Attribute Identifier |
|---|---|---|
| VIRTUAL_ENDPOINT_SESSIONS | MAX_SESSIONS | 0000b |
| KEY_AGREEMENT | PROTOCOL | 0000b |
| | HASH_ALGORITHM | 0001b |
| | SIGN_ALGORITHM | 0010b |
| | MAC_ALGORITHM | 0011b |
| {LINK_LEVEL\|TRANSACTION_LEVEL\|APPLICATION_LEVEL}_PROTECTION | PROTECTION_TYPE | 0000b |
| | AES_BLOCK_CIPHER_MODE | 0001b |
| | AES_KEY_SIZE | 0010b |
| | MAC_ALGORITHM | 0011b |
| ENDPOINT_LOCKING | LOCKING_LEVEL | 0000b |
| CONFIGURATION_REPORTING | REPORTING_FORMAT | 0000b |
| SESSION_TERMINATION_POLICY | EXIT_TRIGGER | 0000b |

The format of the CAPABILITY REQUEST messages from the host and the corresponding responses from the device may be defined as follows. In the query message, the host identifies the capability being enumerated by its capability identifier. The response message from the device consists of one or more (attribute, value) pairs, with the attribute defined by its attribute identifier.

Virtual Endpoint Sessions: The Virtual Endpoint Sessions request enumerates the number of concurrent, VE sessions supported by the device, as provided in Tables 12 and 13.

TABLE 12

CAPABILITY_REQUEST (Virtual Endpoint Sessions

| Offset | Field | Size (Bytes) | Value |
|---|---|---|---|
| 0 | Type | 2 | 0000h (CAPABILITY_REQUEST) |
| 1 | Version | 1 | 01h |
| 2 | Reserved | 2 | N/A |
| 4 | Payload Length | 4 | 00000001h |
| 8 | Payload | 1 | 00h (Capability ID = VIRTUAL_ENDPOINT_SESSIONS) |

TABLE 13

CAPABILITY_REQUEST Response (Virtual Endpoint Sessions

| Offset | Field | Size (Bytes) | Value |
|---|---|---|---|
| 0 | Type | 2 | 0000h (CAPABILITY_REQUEST) |
| 1 | Version | 1 | 01h |
| 2 | Reserved | 2 | N/A |
| 4 | Payload Length | 4 | 00000005h |
| 8 | Payload: Capability\|\|Attribute | 1 | 00h (VIRTUAL_ENDPOINT_SESSIONS = 0000b \|\| MAX_SESSIONS = 0000b) |
| 9 | Payload: Attribute Value | 4 | Number of concurrent VE sessions supported. |

Key Agreement: The Key Agreement request enumerates the protocols and algorithms supported by the device for Key Agreement, as provided in Tables 14 and 15.

TABLE 14

CAPABILITY_REQUEST (Key Agreement)

| Offset | Field | Size (Bytes) | Value |
|---|---|---|---|
| 0 | Type | 2 | 0000h (CAPABILITY_REQUEST) |
| 1 | Version | 1 | 01h |
| 2 | Reserved | 2 | N/A |
| 4 | Payload Length | 4 | 00000001h |
| 8 | Payload | 1 | 01h (Capability ID = KEY_AGREEMENT) |

TABLE 15

CAPABILITY_REQUEST Response (Key Agreement)

| Offset | Field | Size (Bytes) | Value |
|---|---|---|---|
| 0 | Type | 2 | 0000h (CAPABILITY_REQUEST) |
| 1 | Version | 1 | 01h |
| 2 | Reserved | 2 | N/A |
| 4 | Payload Length | 4 | 00000008h |
| 8 | Payload: Capability\|\|Attribute | 1 | 10h (KEY_AGREEMENT = 0001b \| PROTOCOLS = 0000b) |
| 9 | Payload: Attribute Value | 1 | Key Agreement Protocols Unsupported: 00h SIGMA: 01h ECDH: 02h |
| 10 | Payload: Capability\|\|Attribute | 1 | 11h (KEY_AGREEMENT = 0001b \|\| HASH_ALGORITHM = 0001b) |
| 11 | Payload: Attribute Value | 1 | Hash Algorithms Unsupported: 00h SHA-256: 01h SHA-384: 02h SHA-512: 04h SHA3-256: 08h SHA3-384: 10h SHA3-512: 20h |
| 12 | Payload: Capability\|\|Attribute | 1 | 12h (KEY_AGREEMENT = 0001b \|\| SIGNING_ALGORITHM = 0010b) |
| 13 | Payload: Attribute Value | 1 | Signing Algorithms Unsupported: 00h RSA 2048: 01h RSA 3072: 02h ECDSA-Find standard curves and parameters |
| 14 | Payload: Capability\|\|Attribute | 1 | 13h (KEY_AGREEMENT = 0001b \|\| MAC_ALGORITHM = 0011b) |
| 15 | Payload: Attribute Value | 1 | MAC Algorithms Unsupported: 00h HMAC-256: 01h HMAC-384: 02h HMAC-512: 04h KMAC-128: 08h KMAC-256: 10h |

If more than one protocol or algorithm is supported, the bit strings are OR'ed together to yield the corresponding field of the response payload.

Protection Levels: The Protection Levels request enumerates the security protections offered by the device for each protection level, as provided in Tables 16 and 17.

TABLE 16

CAPABILITY_REQUEST (Protection Levels)

| Offset | Field | Size (Bytes) | Value |
|---|---|---|---|
| 0 | Type | 2 | 0000h (CAPABILITY_REQUEST) |
| 1 | Version | 1 | 01h |
| 2 | Reserved | 2 | N/A |
| 4 | Payload Length | 4 | 00000001h |
| 8 | Payload | 1 | 02h or 03h or 04h (Capability IDs for link, transaction and data levels, respectively) |

TABLE 17

CAPABILITY_REQUEST Response (Protection Levels)

| Offset | Field | Size (Bytes) | Value |
|---|---|---|---|
| 0 | Type | 2 | 0000h (CAPABILITY_REQUEST) |
| 1 | Version | 1 | 01h |
| 2 | Reserved | 2 | N/A |
| 4 | Payload Length | 4 | 00000008h |
| 8 | Payload: Capability\|\|Attribute | 1 | {20h\|30h\|40h} (PROTECTION_LEVEL\|\|PROTECTION_TYPE) |
| 9 | Payload: Attribute Value | 1 | Protections: 01h: Confidentiality 02h: Integrity 04h: Anti-replay |
| 10 | Payload: Capability\|\|Attribute | 1 | {21h\|31h\|41h} (PROTECTION_LEVEL\|\|AES_BLOCK_CIPHER_MODE) |
| 11 | Payload: Attribute Value | 1 | AES Block Cipher Modes: CTR: 01h CBC: 02h GCM: 04h |
| 12 | Payload: Capability\|\|Attribute | 1 | {22h\|32h\|42h} (PROTECTION_LEVEL\|\|AES_KEY_SIZE) |
| 13 | Payload: Attribute Value | 1 | AES Key Sizes: 128: 01h 192: 02h 256: 04h |
| 14 | Payload: Capability\|\|Attribute | 1 | {23h\|33h\|43h} (PROTECTION_LEVEL\|\|MAC_ALGORITHM) |
| 15 | Payload: Attribute Value | 1 | MAC: Unsupported: 00h HMAC-256: 01h HMAC-384: 02h HMAC-512: 04h KMAC-128: 08h KMAC-256: 10h |

Endpoint Locking: The Endpoint Locking request enumerates the granularity at which a part of a device might be locked for Trusted I/O, as provided in Tables 18 and 19.

TABLE 18

CAPABILITY_REQUEST (Endpoint Locking)

| Offset | Field | Size (Bytes) | Value |
|---|---|---|---|
| 0 | Type | 2 | 0000h (CAPABILITY_REQUEST) |
| 1 | Version | 1 | 01h |
| 2 | Reserved | 2 | N/A |
| 4 | Payload Length | 4 | 00000001h |
| 8 | Payload | 1 | 05h (Capability ID) |

TABLE 19

CAPABILITY_REQUEST Response (Endpoint Locking)

| Offset | Field | Size (Bytes) | Value |
|---|---|---|---|
| 0 | Type | 2 | 0000h (CAPABILITY_REQUEST) |
| 1 | Version | 1 | 01h |
| 2 | Reserved | 2 | N/A |
| 4 | Payload Length | 4 | 00000002h |
| 8 | Payload: Capability\|\|Attribute | 1 | 50h (ENDPOINT_LOCKING\|\|LOCKING_LEVEL) |
| 9 | Payload: Attribute Value | 1 | Locking Levels: 01h: Physical Function (PF) 02h: Virtual Function (VF) 04h: PASID |

Configuration Reporting: The Configuration Reporting request enumerates the formats supported by the device for reporting its configuration, as provided in Tables 20 and 21.

TABLE 20

CAPABILITY_REQUEST (Configuration Reporting)

| Offset | Field | Size (Bytes) | Value |
|---|---|---|---|
| 0 | Type | 2 | 0000h (CAPABILITY_REQUEST) |
| 1 | Version | 1 | 01h |
| 2 | Reserved | 2 | N/A |
| 4 | Payload Length | 4 | 00000001h |
| 8 | Payload | 1 | 06h (Capability ID) |

TABLE 21

CAPABILITY_REQUEST Response (Configuration Reporting)

| Offset | Field | Size (Bytes) | Value |
|---|---|---|---|
| 0 | Type | 2 | 0000h (CAPABILITY_REQUEST) |
| 1 | Version | 1 | 01h |
| 2 | Reserved | 2 | N/A |
| 4 | Payload Length | 4 | 00000002h |
| 8 | Payload: Capability\|\|Attribute | 1 | 60h (CONFIGURATION_REPORTING_REPORTING_FORMAT) |
| 9 | Payload: Attribute Value | 2 | Byte 9: Schema ID<br>Byte 10: Reporting Formats:<br>01h: ASN.1<br>02h: XML |

Session Termination Policy: The Session Termination Policy request enumerates the session termination policies supported by the device, as provided in Tables 22 and 23.

TABLE 22

CAPABILITY_REQUEST (Session Termination Policy)

| Offset | Field | Size (Bytes) | Value |
|---|---|---|---|
| 0 | Type | 2 | 0000h (CAPABILITY_REQUEST) |
| 1 | Version | 1 | 01h |
| 2 | Reserved | 2 | N/A |
| 4 | Payload Length | 4 | 00000001h |
| 8 | Payload | 1 | 07h (Capability ID) |

TABLE 23

CAPABILITY_REQUEST Response (Session Termination Policy)

| Offset | Field | Size (Bytes) | Value |
|---|---|---|---|
| 0 | Type | 2 | 0000h (CAPABILITY_REQUEST) |
| 1 | Version | 1 | 01h |
| 2 | Reserved | 2 | N/A |
| 4 | Payload Length | 4 | 00000002h |
| 8 | Payload: Capability\|\|Attribute | 1 | 70h (SESSION_TERMINATION_POLICY\|\|EXIT_TRIGGER) |
| 9 | Payload: Attribute Value | 1 | Session Exit Triggers:<br>01h: Timeout<br>02h: Protection Violation<br>04h: Access Control Violation<br>80h: Power State Transition (D0 -> D3) |

Session Negotiation: Once the host has enumerated the capabilities of the device, it is ready to request a session with specific parameters for various session capabilities. The host sends a message of type REQUEST_PE_SESSION (or REQUEST_VE_SESSION), along with the session capability parameters to request a session. The capability parameters are communicated as a list of (attribute identifier, attribute value) pairs in the payload of the request.

Upon receiving the request, the device is to determine if it can support the requested session. This determination will depend on a number of factors, including:

(a) Number of active sessions running at that time.

(b) Conflict with existing sessions. For example, if the host requests a session with a device endpoint that is already in a session, the request shall be rejected.

(c) Validity of the capability parameters requested by the host. The request must be well-formed and the parameters must conform to the values enumerated during discovery.

If the device accepts the request, it returns a token called Session ID that uniquely identifies the session granted to the host, along with a cryptographic hash of the session request payload. In the future, any request associated with the granted session is to include the Session ID.

If the device rejects the request, it returns an error code indicating the reason for the rejection.

TABLE

REQUEST_{PE\|VE}_SESSION

| Offset | Field | Size (Bytes) | Value |
|---|---|---|---|
| 0 | Type | 2 | 1000h (REQUEST_PE_SESSION)<br>1001h (REQUEST_VE_SESSION) |
| 1 | Version | 1 | 01h |
| 2 | Reserved | 2 | N/A |
| 4 | Payload Length | 4 | 2*N (N = number of (capability attribute, value) pairs) |
| 8 | Payload: | 1 | Ex. 10h (0001b \|\| 0000b = |

TABLE-continued

REQUEST_{PE|VE}_SESSION

| Offset | Field | Size (Bytes) | Value |
|---|---|---|---|
| 9 | Capability\|\|Attribute Payload: Attribute Value | 1 | KEY_AGREEMENT \|\| PROTOCOL) Ex. 01h (SIGMA) |
| ... | ... | ... | ... |
| 6 + 2*N | Payload: Capability\|\|Attribute | 1 | ... |
| 7 + 2*N | Payload: Attribute Value | 1 | ... |

Table 24 describes the format of the REQUEST_PRIMARY_SESSION message. The payload of the message is a sequence of (Capability Attribute, Value) pairs that use the identifiers and values defined in the previous section on Capability Discovery. Table 25 describes a format of the response.

TABLE 25

REQUEST_{PE|VE}_SESSION Response

| Offset | Field | Size (Bytes) | Value |
|---|---|---|---|
| 0 | Type | 2 | 1000h (REQUEST_PE_SESSION) 1001h (REQUEST_VE_SESSION) |
| 1 | Version | 1 | 01h |
| 2 | Reserved | 2 | N/A |
| 4 | Payload Length | 4 | 00000008h |

TABLE 25-continued

REQUEST_{PE|VE}_SESSION Response

| Offset | Field | Size (Bytes) | Value |
|---|---|---|---|
| 8 | Payload: Return Code | 4 | ACCEPT: 00000000h REJECT: 8XXXXXXXXh (Reason for rejection) |
| 9 | Payload: Session ID | 4 | Token identifying session. Valid only if session is accepted. |

Key Agreement: Once the device accepts a session request from the host with the stipulated parameters, the device and host are to execute an agreed-upon Key Agreement protocol to establish a shared symmetric key.

Key Agreement Protocol Initiation: The host initiates the Key Agreement protocol by sending the START_KA_PROTOCOL message to the device, as provided in Table 26.

TABLE 26

START_KA_PROTOCOL Request

| Offset | Field | Size (Bytes) | Value |
|---|---|---|---|
| 0 | Type | 2 | 2000h (BEGIN_KA_PROTOCOL) |
| 1 | Version | 1 | 01h |
| 2 | Reserved | 2 | N/A |
| 4 | Payload Length | 4 | 00000004h |
| 8 | Payload: Session ID | 4 | Session ID from SESSION_REQUEST response. |

Once the device is ready to enter into the Key Agreement protocol, the device transitions its internal session management FSM to the "X" state and sends the response message, which may be as described in Table 27.

TABLE 27

START KA PROTOCOL Response

| Offset | Field | Size (Bytes) | Value |
|---|---|---|---|
| 0 | Type | 2 | 2000 h (START KA PROTOCOL) |
| 1 | Version | 1 | 01 h |
| 2 | Reserved | 2 | N/A |
| 4 | Payload Length | 4 | 00000008 h |
| 8 | Payload: Session ID | 4 | Session ID |
| 8 | Payload: Return Code | 4 | ACCEPT: 00000000 h REJECT: 8XXXXXXXX h (Reason for rejection) |

Figure 6A:
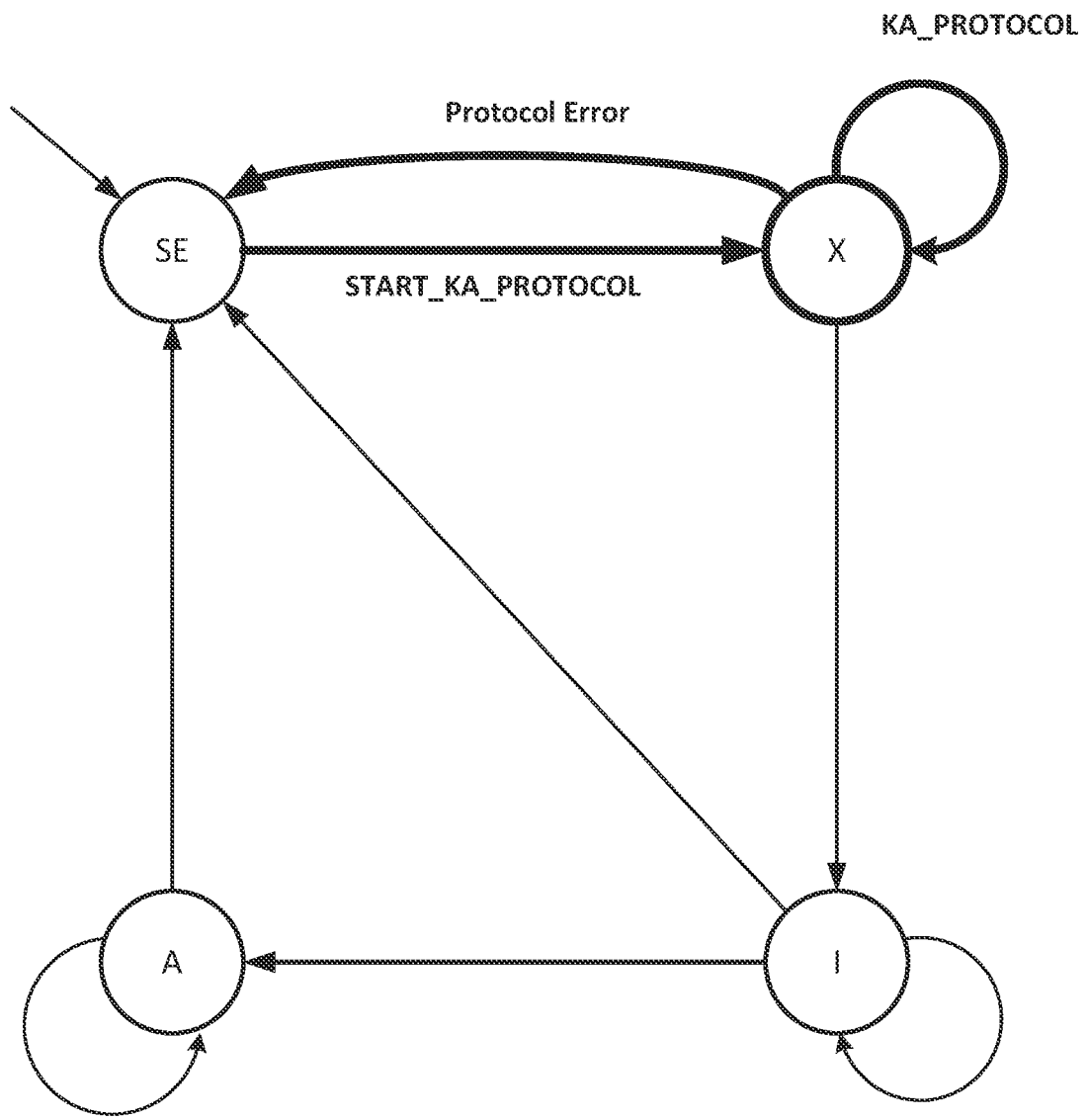
FIG. 6A is a state machine to illustrate a process for key agreement protocol in secure session between a host system and a trusted device according to some embodiments.

FIG. 6A is a state machine to illustrate a process for key agreement protocol in secure session between a host system and a trusted device according to some embodiments. As illustrated, upon a START_KA_PROTOCOL message, the system transitions from the initial "SE" State to the "X" State.

Following the transition to the "X" state, the host and device exchange the KA PROTOCOL messages to execute the protocol. These messages depend on the specific protocol and algorithms selected. If protocol error occurs, the process returns to the "SE" state.

Figure 6B:
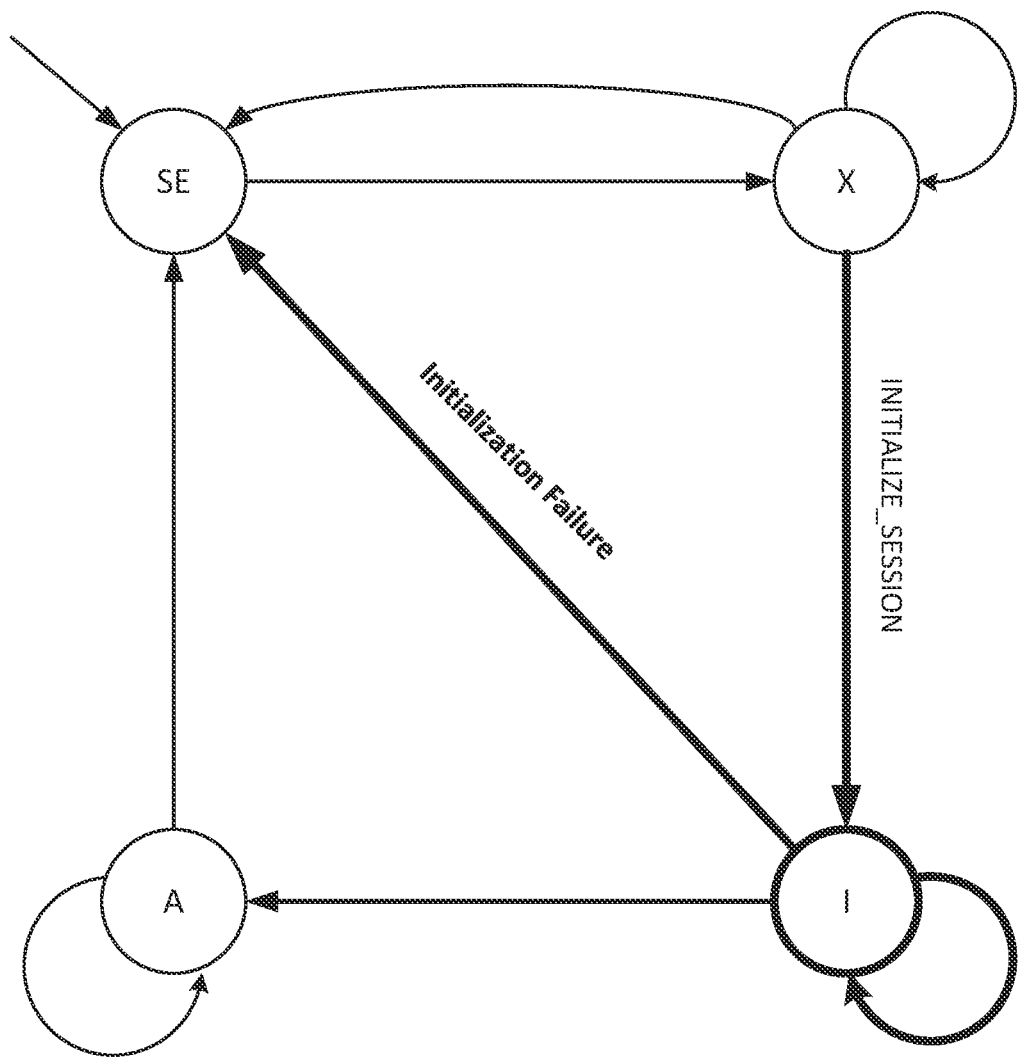
FIG. 6B is a state machine to illustrate a process for session validation and initialization in a secure session between a host system and a trusted device according to some embodiments.

FIG. 6B is a state machine to illustrate a process for session validation and initialization in a secure session between a host system and a trusted device according to some embodiments. At the end of the Key Agreement phase, the host and device share a symmetric key that can be used to protect the communication channel between the two.

Before the session can be activated, depending on the session capabilities negotiated earlier, the host performs the following actions:

(a) Send a message to the device to trigger a transition to the "I" state, as provided in FIG. 6B.

(b) Validate that the versions of the session capabilities agreed upon earlier is the same on the host and device sides. Since the host and device did not share a secure channel before Key Agreement, they could not cryptographically confirm their agreement over the session capabilities.

(c) Provision the device over the secure channel with certain secrets. For example, if link-, transaction- or application-level protection was agreed upon, the host will need to provision the encryption key.

(d) Initialize cryptographic parameters (e.g., initialization vectors, anti-replay sequence numbers, etc.) used by encryption algorithms.

Initialization of Session and Validation of Capabilities: Because the host and the device have established a secure channel only after the key agreement protocol has successfully concluded, the host can request the device to transition to the "I" state AND confirm the session capabilities requested earlier. The device returns the session ID and hash of the host's REQUEST_PE_SESSION message, integrity-protected by the newly established shared symmetric key. The host can then verify if the device's version of the session parameters matches its own.

TABLE 28

INITIALIZE PE SESSION Request

| Offset | Field | Size (Bytes) | Value |
|---|---|---|---|
| 0 | Type | 1 | 3000 h (INITIALIZE PE SESSION) |
| 1 | Version | 1 | 01 h |
| 2 | Reserved | 2 | N/A |
| 4 | Payload Length | 4 | 00000004 h |
| 8 | Payload: Session ID | 4 | Session ID |

TABLE 29

VALIDATE PRIMARY SESSION_CAPABILITIES Response

| Offset | Field | Size (Bytes) | Value |
|---|---|---|---|
| 0 | Type | 1 | 3000 h (INITIALIZE PE SESSION) |
| 1 | Version | 1 | 01 h |
| 2 | Reserved | 2 | N/A |
| 4 | Payload Length | 4 | N1 + N2 + 4 |
| 8 | Payload: Session ID | 4 | Session ID |
| 12 | Payload: Hash of payload of SESSION REQUEST | N1 | |
| 12 + N1 | Payload: mac(K, P) | N2 | Note: Here, "P" includes bytes starting at offset 8 through 11 + N1. |

Key Provisioning: In some embodiments, the host provisions the device with an encryption key using the PROVISION_KEY request message, as provided in Table 30. The encryption key can be used at three different levels (link, transaction and application) as described above. The encryption key is wrapped in the shared, symmetric key derived using the Key Agreement protocol. The MAC of the Session ID and the wrapped encryption key is included in the payload.

TABLE 30

PROVISIONKEY_Request

| Offset | Field | Size (Bytes) | Value |
|---|---|---|---|
| 0 | Type | 2 | 3001 h (PROVISION KEY) |
| 1 | Version | 1 | 01 h |
| 2 | Reserved | 2 | N/A |
| 4 | Payload Length | 4 | N1 + N2 + 5 |
| 8 | Payload: Session ID | 4 | Session ID |
| 12 | Payload: Protection Level | 1 | 01 h: Link-level<br>02 h: Transaction-level<br>03 h: Application-level |

TABLE 30-continued

PROVISIONKEY_Request

| Offset | Field | Size (Bytes) | Value |
|---|---|---|---|
| 13 | Payload: Link Encryption Key | N1 | Link encryption key encrypted with session key. NI depends on size of AES symmetric key agreed upon earlier. |
| 13 + N1 | Payload: mac(K, Payload) | N2 | Note: Here, "Payload" includes bytes starting at offset 8 through 12 + NL. N2 depends on MAC algorithm chosen. |

The device verifies the integrity of the request message. If the integrity check passes, the device will unwrap the link encryption key and configure its link encryption engine with the key. The response message from the device may be as described in Table 31.

TABLE 31

PROVISION_KEY Response

| Offset | Field | Size (Bytes) | Value |
|---|---|---|---|
| 0 | Type | 2 | 3001 h (PROVISION KEY) |
| 1 | Version | 1 | 01 h |
| 2 | Reserved | 2 | N/A |
| 4 | Payload Length | 8 | |
| 8 | Payload: Session ID | 4 | Session ID |
| 12 | Payload: Return Code | 4 | 00000000 h: Success  8XXXXXXX h: Error Codes |
| 16 | Payload: Hash of payload of PROVISION_LINK_KEY request | N1 | |
| 16 + N1 | Payload: mac(K, P) | N2 | Note: Here, "P" includes bytes starting at offset 8 through 15 + N1. |

Cryptographic Parameter Initialization: AES Block Ciphers used for symmetric encryption require IV (nonce+counter) for their operation. The host may use the following message to initialize the IV, as provided in Tables 32 and 33.

TABLE 32

INITIALIZE_IV Request

| Offset | Field | Size (Bytes) | Value |
|---|---|---|---|
| 0 | Type | 2 | 3002h (INITIALIZE_IV) |
| 1 | Version | 1 | 01h |
| 2 | Reserved | 2 | N/A |
| 4 | Payload Length | 4 | N + 22 |
| 8 | Payload: Session ID | 4 | Session ID |
| 12 | Payload: Protection Level | 1 | 01h: Link-level  02h: Transaction-level  04h: Application-level |
| 13 | Payload: Transaction Type | 1 | 01h: Posted  02h: Non Posted  04h: Completions |
| 14 | Payload: Initialization Vector | 16 | |
| 30 | Payload: mac(K, Payload) | N | |

Note:
Here, "Payload" includes bytes starting at offset 8 through 29. N depends on MAC algorithm chosen.

TABLE 33

INITIALIZE_IV Response

| Offset | Field | Size (Bytes) | Value |
|---|---|---|---|
| 0 | Type | 2 | 3002h (INITIALIZE_IV) |
| 1 | Version | 1 | 01h |
| 2 | Reserved | 2 | N/A |
| 4 | Payload Length | 8 | N1 + N2 + 4 |
| 8 | Payload: Session ID | 4 | Session ID |
| 12 | Payload: Return Code | 4 | 00000000h: Success  8XXXXXXXh: Error Codes |
| 16 | Payload: Hash of payload of INITIALIZE_IV request | N1 | |
| 16 + N1 | Payload: mac(K, P) | N2 | |

Note:
Here, "P" includes bytes starting at offset 8 through 15 + N1.

Figure 6C:
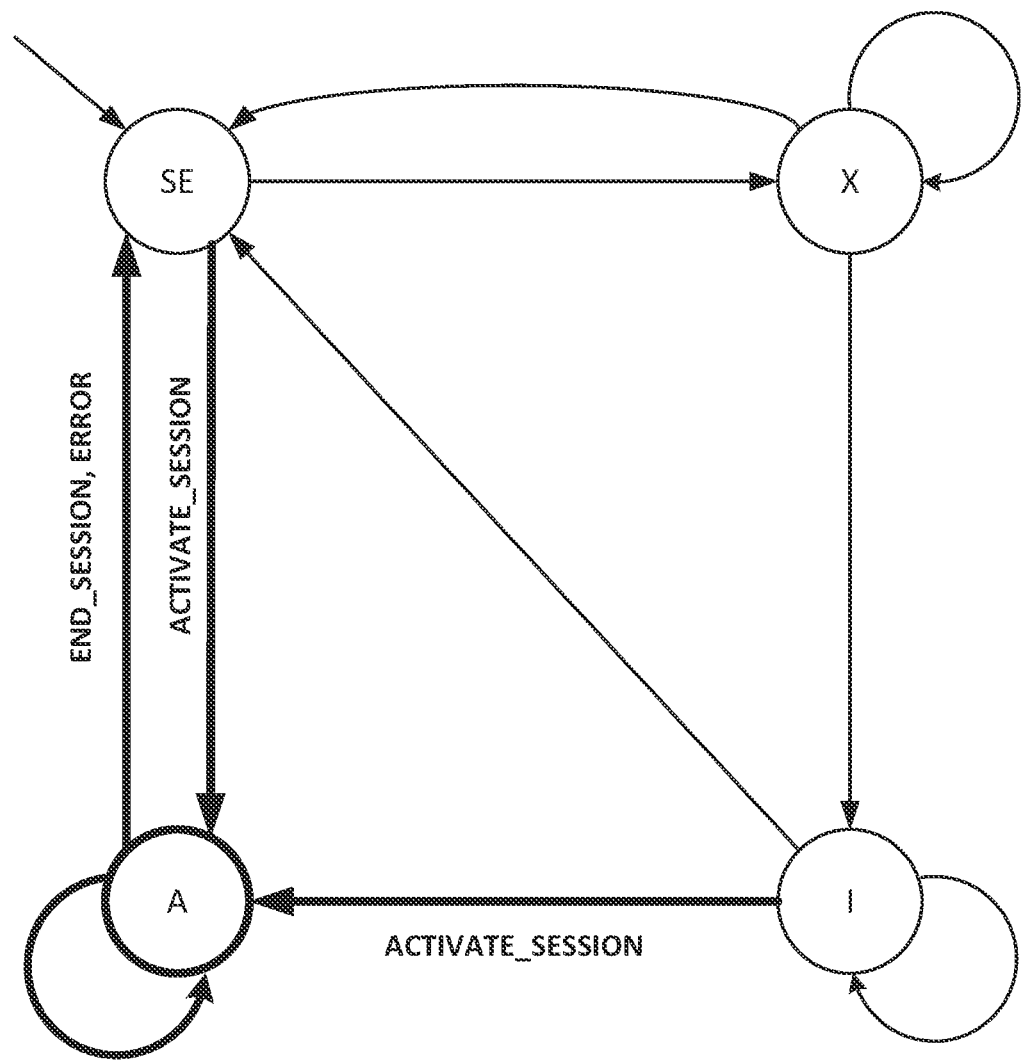
FIG. 6C is a state machine to illustrate a process for session activation, runtime, and termination in a secure session between a host system and a trusted device according to some embodiments.

FIG. 6C is a state machine to illustrate a process for session activation, runtime, and termination in a secure session between a host system and a trusted device according to some embodiments. The processes described above with regard to FIGS. 6A and 6B establish the groundwork for activating the PE (or VE) session. In some embodiments, the host can now activate the session by sending the ACTIVATE_SESSION message. The device then transitions to the "A" state. In this state, the host can request the device to lock the session endpoint and report the device configuration, in preparation for Trusted I/O.

As illustrated in FIG. 6C, there are two possible transitions into the "A" state: one from the "I" state and the other from the "SE" state. Both PE and VE sessions can transition into the "A" state from the "I" state. In some embodiments, it is also possible for a VE session to directly transition to the "A" state from the "SE" state. For example, the host might assign a VF (a virtual device endpoint) to a VM. After establishing a PE session, with link encryption enabled, the host may create a VE session binding the VF to the guest VM. The VE session might rely on the secure channel established by the PE session (link-level), but may specify distinct endpoint locking level (VF-level) and session termination policies.

Session Activation: The host sends the ACTIVATE_SESSION message to the device to initiate the PE or VE session created previously. The request and response messages may be described in Table 35 and Table 36, respectively.

TABLE 35

ACTIVATE SESSION Request

| Offset | Field | Size (Bytes) | Value |
| --- | --- | --- | --- |
| 0 | Type | 2 | 4000 h (ACTIVATE SESSION) |
| 1 | Version | 1 | 01 h |
| 2 | Reserved | 2 | N/A |
| 4 | Payload Length | 4 | N + 4 |
| 8 | Payload: Session ID | 4 | Session ID |
| 12 | Payload: mac(K, Payload) | N | Note: Here, "Payload" includes bytes starting at offset 8 through 12. N depends on the MAC algorithm chosen. |

TABLE 36

ACTIVATE_SESSION Response

| Offset | Field | Size (Bytes) | Value |
| --- | --- | --- | --- |
| 0 | Type | 1 | 4001h (ACTIVATE_SESSION) |
| 1 | Version | 1 | 01h |
| 2 | Reserved | 2 | N/A |
| 4 | Payload Length | 4 | N + 8 |
| 8 | Payload: Session ID | 4 | Session ID |
| 12 | Payload: Return Code | 4 | 00000000h: Success 8XXXXXXXh: Error Codes |
| 16 | Payload: mac(K, P) | N | |

Note:
Here, "P" includes bytes starting at offset 8 through 15. N depends on the MAC algorithm chosen.

Session Runtime: After activating the session, the interface between the host and the device endpoint has been secured. In some embodiments, before the device endpoint can transmit and receive data securely, the host is required to obtain a snapshot of the configuration of the device so that it can decide if the endpoint has been set up correctly. The reporting of configuration is to also be (simultaneously) accompanied by the "locking" of the endpoint. (Locking down an endpoint means that the device shall only allow authorized entities on the host, such as controlling TDs or enclaves, to write/read to/from sensitive registers that control the operation of the endpoint.)

Figure 6D:
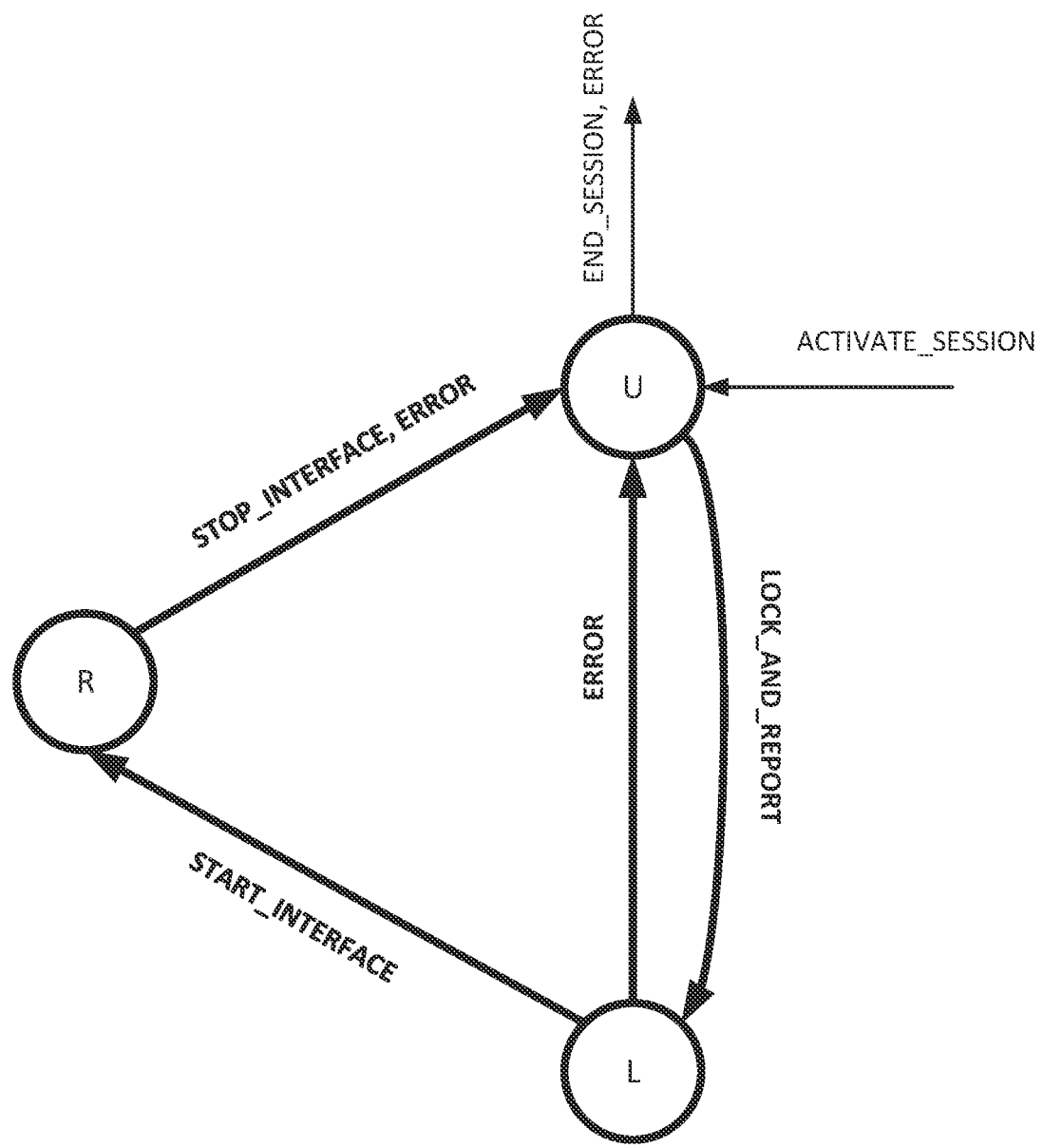
FIG. 6D is a state machine to illustrate a process for an Active state in a secure session between a host system and a trusted device according to some embodiments.

FIG. 6D is a state machine to illustrate a process for an Active state in a secure session between a host system and a trusted device according to some embodiments. FIG. 6D shows the internal process of the Active state in some embodiments. The device enters the active state upon receiving the ACTIVATE_SESSION request message. FIG. 6D shows the FSM that runs in the context of the Active state, which is in the higher level state machine. The Active state FSM consists of the following three states:

(1) Unconfigured (U): In this state, the device configuration has not been validated by the host. This state is both the entry and exit point of the FSM.

(2) Locked (L): The system software on the host sends the LOCK_AND_REPORT request message to transition the device endpoint to the Locked state. In response to this request, the device reports the configuration of the device.

(3) Run (R): Once the host has received and validated the configuration report, it sends the START_INTERFACE request message to put the device endpoint in the Run state. At this point, the device endpoint can exchange data with the host over the secure device-host interface.

Once the host and the device endpoint have completed their trusted I/O interaction, the system software on the host can request the device to stop the interface exposed by the endpoint by sending it the STOP_INTERFACE request message. In response to that message the device goes back into the unconfigured state.

The device can also go into the Unconfigured state in the following ways:

(a) The LOCK_AND_REPORT request could not be honored because the interface associated with the device endpoint was already in use.

(b) In the R state, untrusted host software attempted to change the configuration of the device endpoint. In this case, the device unilaterally makes the decision to go to the U state.

Session Termination: In some embodiments, in the U state, the host may determine to end the trusted I/O session with the device altogether. The host does so by sending an END_SESSION request message. In response to this message, the device terminates the session and clears all the session collateral, including keys and other secrets. This takes the device back to the "SE" state, shown in FIG. 6C.

In FIG. 6D, the other path from the U state in the nested FSM to the "SE" state in the higher level FSM is in response to an abnormal event. Examples of abnormal events leading to termination session include:

(1) The device goes through a power state transition (e.g., D0→D3) because of which it is not able to maintain session state.

(2) The device detects a hot unplug event.

(3) A debug interface on the device (e.g., JTAG) is accessed when a production session is active.

(4) Untrusted host software violates an access control rule that might interfere with the proper behavior of the trusted I/O session. For example, in TDX Trusted I/O, the host OS or driver might attempt to modify a privileged register associated with an endpoint that was locked down in the Active state.

The END_SESSION request and response messages may be described in Table 37 and Table 38, respectively.

TABLE 37

END SESSION Request Message

| Offset | Field | Size (Bytes) | Value |
|---|---|---|---|
| 0 | Type | 2 | 4003 h (END SESSION) |
| 1 | Version | 1 | 01 h |
| 2 | Reserved | 2 | N/A |
| 4 | Payload Length | 4 | N + 4 |
| 8 | Payload: Session ID | 4 | Session ID |
| 12 | Payload: mac(K, Payload) | N | Note: Here, "Payload" includes bytes starting at offset 8 through 12. N depends on the MAC algorithm chosen. |

TABLE 38

END_SESSION Response Message

| Offset | Field | Size (Bytes) | Value |
|---|---|---|---|
| 0 | Type | 1 | 4003h (END_SESSION) |
| 1 | Version | 1 | 01h |
| 2 | Reserved | 2 | N/A |
| 4 | Payload Length | 4 | N + 8 |
| 8 | Payload: Session ID | 4 | Session ID |
| 12 | Payload: Return Code | 4 | 00000000h: Success  8XXXXXXXh: Error Codes |
| 16 | Payload: mac(K, P) | N | |

Note:
Here, "P" includes bytes starting at offset 8 through 15. N depends on the MAC algorithm chosen.

Endpoint Locking and Configuration Reporting: Table 39 describes a format of the LOCK_AND_REPORT request message. The message identifies the session and device endpoint ID. Note that the schema and format of the device configuration report to be returned by the device was negotiated earlier when the session was created.

TABLE 39

LOCK AND REPORT Request Message

| Offset | Field | Size (Bytes) | Value |
|---|---|---|---|
| 0 | Type | 2 | 4002 h (LOCK AND REPORT) |
| 1 | Version | 1 | 01 h |
| 2 | Reserved | 2 | N/A |
| 4 | Payload Length | 4 | N + 4 |
| 8 | Payload: Session ID | 4 | Session ID |
| 12 | Payload: Device Endpoint ID | 5 | {PF Requester ID VF Requester ID}\|\|[PASID] Bytes 12, 13: 16-bit Requester ID of PF or VF, depending on type of endpoint. Bytes 14, 15, 16: Optional 20-bit PASID |
| 17 | Nonce | 8 | Anti-replay nonce. |
| 25 | Payload: mac(K, Payload) | N | Note: Here, "Payload" includes bytes starting at offset 8 through 24. N depends on the MAC algorithm chosen. |

Table 40 describes a format of a device response to the LOCK_AND_REPORT request.

TABLE 40

LOCK AND REPORT Response Message

| Offset | Field | Size (Bytes) | Value |
|---|---|---|---|
| 0 | Type | 1 | 4002 h (LOCK AND REPORT) |
| 1 | Version | 1 | 01 h |
| 2 | Reserved | 2 | N/A |
| 4 | Payload Length | 4 | 12 + N1 + N2 |

TABLE 40-continued

LOCK AND REPORT Response Message

| Offset | Field | Size (Bytes) | Value |
|---|---|---|---|
| 8 | Payload: Session ID | 4 | Session ID |
| 12 | Payload: Return Code | 4 | 00000000 h: Success<br>8XXXXXXX h: Error Codes |
| 16 | Payload: Device Configuration Report | N1 | Content and size is dependent on report schema and format negotiated during session creation. |
| 16 + N1 | Payload: mac(K, P) | N2 | Note: Here, "P" includes bytes starting at offset 8 through 16 + N1 − LN2 depends on the MAC algorithm chosen. |

Device Configuration Report: The device configuration report, as provided in Table 41, describes the current configuration of the device. It is used by the trusted software on the host to make a determination about the state of the device before it can initiate trusted I/O. The content of the report depends on the agreed upon schema during session creation. The type of information included in the report will depend on the needs of the trusted software on the host. In this section, we give an informal description of the report using an example from TDX Trusted I/O.

TABLE 41

TDX I/O Device Configuration Report Format

| Field | Size (bits) | Description |
|---|---|---|
| Device ID | 80 | A structure containing the following fields describing device class, vendor and function(s). These values are typically found in PCI Express configuration space registers.<br>Vendor ID (16)<br>Device ID (16)<br>Revision ID (8)<br>Prog IF (8)<br>Base Class (8)<br>Sub Class (8)<br>Sub Vendor ID (16)<br>Sub System ID (16) |
| Device Slot | 16 | PCI Express Requester ID |
| MMIO Range Count | 32 | Number of MMIO ranges for the device |
| MMIO Ranges | 94 | Array of MMIO ranges. Each range is described by the following structure:<br>Physical Address (64)<br>Page Count (32)<br>Page Type (8) |
| Link Interface Status | 8 | Is link encryption enabled? |
| Nonce | 64 | A nonce sent by the trusted software on the host that was included in the LOCK AND REPORT request message. |
| Hash | 256 | Hash over all the previous fields. Note that the size is dependent on the hash algorithm chosen. Here, SHA-256 algorithm was assumed. |
| MAC | 512 | MAC computed over the hash value above. Note that the size is dependent on the MAC algorithm chosen. Here, HMAC SHA256 was assumed. |

Figure 7:
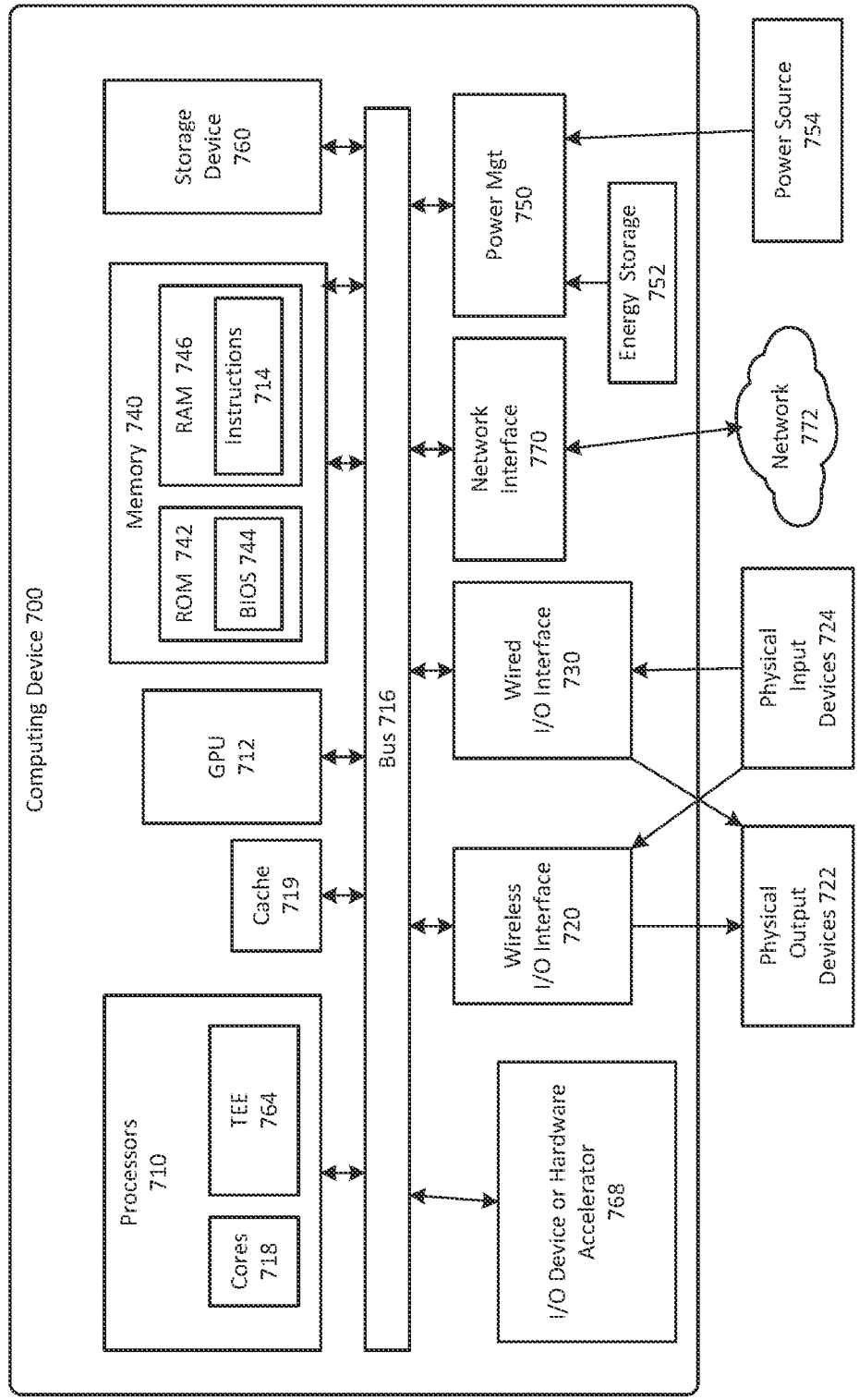
FIG. 7 is a schematic diagram of a computing device to provide a session management framework for secure communications with trusted devices according to some embodiments.

FIG. 7 is a schematic diagram of a computing device to provide a session management framework for secure communications with trusted devices according to some embodiments. In some embodiments, the computing device 700 includes one or more processors including one or more processors cores and a TEE or secure enclave 764 to enable maintenance of security of data, such as TEE 132 illustrated in FIG. 1. In some embodiments, the computing device 700 includes an I/O device or hardware accelerator 768, such as device 170 illustrated in FIG. 1. In some embodiments, the computing device 700 is to support a session management framework to for secure communications between the computing device 700 and I/O device or hardware accelerator 768, as illustrated in FIGS. 1-6D.

The computing device 700 may additionally include one or more of the following: cache 719, a graphical processing unit (GPU) 712, a wireless input/output (I/O) interface 720, a wired I/O interface 730, memory circuitry 740, power management circuitry 750, non-transitory storage device 760, and a network interface 770 for connection to a network 772. The following discussion provides a brief, general description of the components forming the illustrative computing device 700. Example, non-limiting computing devices 700 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 700 includes a bus or similar communications link 716 that communicably couples and facilitates the exchange of information and/or data between various system components including the processor cores 718, the cache 719, the graphics processor circuitry 712, one or more wireless I/O interfaces 720, one or more wired I/O interfaces 730, one or more storage devices 760, and/or one or more network interfaces 770. The computing device 700 may be referred to in the singular herein, but this is not intended to limit the embodiments to a single computing device 700, since in certain embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 716 that interconnects at least some of the components of the computing device 700 may employ any currently available or future developed serial or parallel bus structures or architectures.

The system memory 740 may include read-only memory ("ROM") 742 and random access memory ("RAM") 746. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include, but are not limited to: universal serial bus (USB), IEEE 1394 ("FireWire"), and similar.

The computing device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The computing device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

In some embodiments, one or more non-transitory computer-readable storage mediums having stored thereon executable computer program instructions that, when executed by one or more processors, cause the one or more processors to perform operations including establishing a security agreement between a host system and a trusted device, the host device including a trusted execution environment (TEE); initiating a key exchange between the host system and the trusted device, including sending a key agreement message from the host system to the trusted device; sending an initialization message to the trusted device; validating capabilities of the trusted device for a secure communication session between the host system and the trusted device; provisioning secrets to the trusted device and initializing cryptographic parameters with the trusted device; and sending an activate session message to the trusted device to activate the secure communication session over a secure communication channel.

In some embodiments, establishing the security agreement includes querying the trusted device to determine if the device supports authentication, querying the trusted device regarding capabilities of the device to support a secure communication session, and negotiation to establish the security agreement between the host device and the trusted device.

In some embodiments, the instructions include instructions for upon activating the secure communication session between the host system and the trusted device, transmitting and receiving secure communications over the secure communications channel.

In some embodiments, the instructions include instructions for, upon activating the secure communication session, receiving a snapshot of a configuration of the trusted device, an endpoint of the trusted device being locked to allow only authorized entities to read from or write to certain registers.

In some embodiments, the instructions include instructions for terminating the secure communications session, including the host device transmitting an end session request message to the trusted device.

In some embodiments, the secure communication session is either a single physical endpoint session for the trusted device or one or more virtual endpoint sessions for the trusted device.

In some embodiments, the trusted device includes a register interface including a plurality of registers for management of the secure communications session.

In some embodiments, the trusted device is a trusted I/O device or hardware accelerator device.

In some embodiments, the trusted device is a PCIe (PCI (Peripheral Component Interconnect) Express) device.

In some embodiments, an apparatus includes one or more processors including a trusted execution environment (TEE); a computer memory to store data including program data; and an interface with a trusted device, wherein the apparatus is to establish a security agreement with the trusted device; initiate a key exchange with the trusted device, including sending a key agreement message from to the trusted device; send an initialization message to the trusted device; validate capabilities of the trusted device for a secure communication session between the apparatus and the trusted device; provision secrets to the trusted device and initialize cryptographic parameters with the trusted device; and send an activate session message to the trusted device to activate the secure communication session over a secure communication channel.

In some embodiments, establishing the security agreement includes the apparatus to query the trusted device to determine if the device supports authentication, query the trusted device regarding capabilities of the device to support a secure communication session, and negotiate to establish the security agreement between the apparatus and the trusted device.

In some embodiments, upon activating the secure communication session, the apparatus is to receive a snapshot of a configuration of the trusted device, an endpoint of the trusted device being locked to allow only authorized entities to read from or write to certain registers.

In some embodiments, the secure communication session is either a single physical endpoint session for the trusted device or one or more virtual endpoint sessions for the trusted device.

In some embodiments, the trusted device includes a register interface including a plurality of registers for management of the secure communications session.

In some embodiments, the trusted device is a trusted I/O device or hardware accelerator device.

In some embodiments, the trusted device is a PCIe (PCI (Peripheral Component Interconnect) Express) device.

In some embodiments, a method includes establishing a security agreement between a trusted device and a host system, the host system including a trusted execution environment (TEE); performing a key exchange between the trusted device and the host system; providing capability information for the trusted device to the host system for a secure communication session between the host system and the trusted device; receiving secrets from the host system at the trusted device and establishing cryptographic parameters with the host system; and activating the secure communication session over a secure communication channel with the host system.

In some embodiments, establishing the security agreement includes:

providing information regarding support of the trusted device for authentication to the host system; providing information regarding capabilities of the trusted device to support a secure communication session to the host system; and negotiating with the host system to establish the security agreement between the trusted device and the host device.

In some embodiments, the method further includes, upon establishing the secure communication session between the trusted device and the host system, transmitting and receiving secure communications over the secure communications channel.

In some embodiments, the method further includes providing a snapshot of a configuration of the trusted device to the host system; and locking an endpoint of the trusted device to allow only authorized entities to read from or write to certain registers.

In some embodiments, the method further includes terminating the secure communications session upon receipt of an end session request message from the host system.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. One or more non-transitory computer-readable storage mediums having stored thereon executable computer program instructions that, when executed by one or more processors, cause the one or more processors to perform operations comprising:
　　establishing a security agreement between a host system and a trusted device, the host system including a trusted execution environment (TEE), the trusted device including a register interface including a plurality of registers for management of a secure communications session;
　　initiating a key exchange between the host system and the trusted device, including sending a key agreement message from the host system to the trusted device;
　　sending an initialization message to the trusted device;
　　validating session capabilities of the trusted device for the secure communications session between the host system and the trusted device, wherein validating the session capabilities includes:

reading a capability register in the register interface to discover one or more capabilities of the trusted device to support management of secure sessions, and querying the trusted device regarding attributes of the discovered one or more capabilities; and establishing the secure communications session between the host system and the trusted device based at least in part on the discovered one or more capabilities of the trusted device and the attributes of the one or more capabilities.

2. The one or more mediums of claim 1, wherein the session capabilities include support for one or more of:

virtual endpoint sessions for the trusted device, the secure communications session being either a single physical endpoint session for the trusted device or one or more virtual endpoint sessions for the trusted device;

support for one or more key agreement protocols;

support for security at one or more different PCIe (PCI (Peripheral Component Interconnect) Express) layers; or support for endpoint locking for the trusted device.

3. The one or more mediums of claim 1, wherein the instructions further include instructions for:

controlling one or more behaviors of the trusted device utilizing a control register in the register interface.

4. The one or more mediums of claim 3, wherein the one or more behaviors include the trusted device to:

abort a message;

issue an interrupt; or start consuming a message written to a mailbox register.

5. The one or more mediums of claim 1, wherein the instructions further include instructions for:

reading one or more responses from the trusted device utilizing a status register in the register interface.

6. The one or more mediums of claim 1, wherein establishing the security agreement includes:

querying the trusted device to determine if the trusted device supports authentication; and negotiating to establish the security agreement between the host system and the trusted device.

7. The one or more mediums of claim 1, wherein the instructions further include instructions for:

upon establishing the secure communications session between the host system and the trusted device, transmitting and receiving secure communications with the trusted device.

8. The one or more mediums of claim 1, wherein the instructions further include instructions for:

terminating the secure communications session, including the host system transmitting an end session request message to the trusted device.

9. The one or more mediums of claim 1, wherein the trusted device is a trusted I/O device or hardware accelerator device.

10. An apparatus comprising:

one or more processors including a trusted execution environment (TEE);

a computer memory to store data including program data; and an interface with a trusted device;

wherein the one or more processors are to:

establish a security agreement with a trusted device, the trusted device including a register interface including a plurality of registers for management of a secure communications session;

initiate a key exchange with the trusted device, including sending a key agreement message to the trusted device;

sending an initialization message to the trusted device;

validating session capabilities of the trusted device for the secure communications session between the apparatus and the trusted device, wherein validating the session capabilities includes:

reading a capability register in the register interface to discover one or more capabilities of the trusted device to support management of secure sessions, and querying the trusted device regarding attributes of the discovered one or more capabilities; and establish the secure communications session between the apparatus and the trusted device based at least in part on the discovered one or more capabilities of the trusted device and the attributes of the one or more capabilities.

11. The apparatus of claim 10, wherein the session capabilities include support for one or more of:

virtual endpoint sessions for the trusted device, the secure communications session being either a single physical endpoint session for the trusted device or one or more virtual endpoint sessions for the trusted device;

support for one or more key agreement protocols;

support for security at one or more different PCIe (PCI (Peripheral Component Interconnect) Express) layers; or support for endpoint locking for the trusted device.

12. The apparatus of claim 10, wherein the one or more processors are further to:

controlling one or more behaviors of the trusted device utilizing a control register in the register interface.

13. The apparatus of claim 12, wherein the one or more behaviors include the trusted device to:

abort a message;

issue an interrupt; or start consuming a message written to a mailbox register.

14. The apparatus of claim 10, wherein the one or more processors are further to:

read one or more responses from the trusted device utilizing a status register in the register interface.

15. The apparatus of claim 10, wherein establishing the security agreement includes:

querying the trusted device to determine if the trusted device supports authentication; and negotiating to establish the security agreement between the apparatus and the trusted device.

16. The apparatus of claim 10, wherein the one or more processors are further to:

upon establishing the secure communications session between the apparatus and the trusted device, transmit and receive secure communications with the trusted device.

17. A method comprising:

establishing a security agreement between a host system and a trusted device, the host system including a trusted execution environment (TEE), the trusted device including a register interface including a plurality of registers for management of a secure communications session;

initiating a key exchange between the host system and the trusted device, including sending a key agreement message from the host system to the trusted device;

sending an initialization message to the trusted device;

validating session capabilities of the trusted device for the secure communications session between the host system and the trusted device, wherein validating the session capabilities includes:

reading a capability register in the register interface to discover one or more capabilities of the trusted device to support management of secure sessions, and querying the trusted device regarding attributes of the discovered one or more capabilities; and establishing the secure communications session between the host system and the trusted device based at least in part on the discovered one or more capabilities of the trusted device and the attributes of the one or more capabilities.

18. The method of claim 17, wherein the session capabilities include support for one or more of:

virtual endpoint sessions for the trusted device, the secure communications session being either a single physical endpoint session for the trusted device or one or more virtual endpoint sessions for the trusted device;

support for one or more key agreement protocols;

support for security at one or more different PCIe (PCI (Peripheral Component Interconnect) Express) layers; or support for endpoint locking for the trusted device.

19. The method of claim 17, further comprising:

controlling one or more behaviors of the trusted device utilizing a control register in the register interface.

20. The method of claim 17, further comprising:

reading one or more responses from the trusted device utilizing a status register in the register interface.

\* \* \* \* \*